US011205222B2

(12) United States Patent
Way et al.

(10) Patent No.: US 11,205,222 B2
(45) Date of Patent: Dec. 21, 2021

(54) CENTRALIZED MODEL FOR LENDING RISK MANAGEMENT SYSTEM

(71) Applicant: QCash Financial, LLC, Olympia, WA (US)

(72) Inventors: Steve Way, Sherwood, OR (US); Ben Morales, Olympia, WA (US); Heidi Tinsley, Tumwater, WA (US); Mark Baumgartner, Olympia, WA (US)

(73) Assignee: QCASH FINANCIAL, LLC, Olympia, WA (US)

( * ) Notice: Subject to any disclaimer, the term of this patent is extended or adjusted under 35 U.S.C. 154(b) by 433 days.

(21) Appl. No.: 15/861,661

(22) Filed: Jan. 3, 2018

(65) Prior Publication Data

US 2019/0205978 A1 Jul. 4, 2019

(51) Int. Cl.
*G06Q 40/00* (2012.01)
*G06Q 40/02* (2012.01)
(Continued)

(52) U.S. Cl.
CPC .......... *G06Q 40/025* (2013.01); *G06F 17/18* (2013.01); *G06N 5/04* (2013.01); *G06Q 40/12* (2013.12)

(58) Field of Classification Search
CPC ....... G06Q 40/025; G06Q 40/12; G06F 17/18
See application file for complete search history.

(56) References Cited

U.S. PATENT DOCUMENTS 6,988,082 B1 1/2006 Williams et al.
8,370,241 B1 2/2013 Cotton
(Continued)

FOREIGN PATENT DOCUMENTS

AU 2008309122 A1 4/2009
AU 2008309122 B 4/2010
(Continued)

OTHER PUBLICATIONS

Jauling Tseng, "Farmer-borrowers' selection of short- and intermediate-term loan contracts: Traditional lenders versus nontraditional lenders," PhD Dissertation, Iowa State Univ, 1996 (Year: 1996).*
(Continued)

*Primary Examiner* — Alexander G Kalinowski
*Assistant Examiner* — William B. Bunker
(74) *Attorney, Agent, or Firm* — Han Santos, PLLC

(57) ABSTRACT

This disclosure describes techniques for determining whether to approve or deny a borrower's lending-product request by selectively using a heuristic and statistical model. More specifically, a borrower may submit a lending-product request to a Heuristic-Statistical Risk Management (HS-RM) system, and in doing so the HS-RM system may analyze relationship attributes of the borrower to determine a likelihood of borrower repaying a loan over a predetermined time period, and avoid being charged off. In some examples, the HS-RM system may execute a plurality of statistical models to determine a charge-off probability score. Each statistical model may be based on a set, or subset of historical lending-product data. A subset of historical lending-product data may be based on a selection bias of shared characteristics within a set of historical lending-product data. The selection bias may be based on characteristics of a lending-product request or relationship attributes of a borrower.

20 Claims, 9 Drawing Sheets

(51) Int. Cl.
*G06F 17/18* (2006.01)
*G06N 5/04* (2006.01)

(56) References Cited

U.S. PATENT DOCUMENTS

| | | | |
|---|---|---|---|
| 8,401,868 B1 | 3/2013 | Bradley et al. | |
| 8,433,631 B1* | 4/2013 | An | G06Q 40/02 705/35 |
| 8,521,631 B2 | 8/2013 | Abrahams et al. | |
| 8,738,519 B2 | 5/2014 | Blanchard et al. | |
| 8,751,378 B2* | 6/2014 | Dornhelm | G06Q 40/00 705/38 |
| 9,280,740 B1 | 3/2016 | Laxmanan et al. | |
| 9,697,469 B2* | 7/2017 | McMahon | G06N 20/20 |
| 9,727,826 B1* | 8/2017 | Lindstrom | H04L 67/10 |
| 2004/0030629 A1 | 2/2004 | Freeman et al. | |
| 2004/0220784 A1* | 11/2004 | Stephenson | G06F 17/18 703/2 |
| 2006/0059073 A1* | 3/2006 | Walzak | G06Q 40/025 705/35 |
| 2006/0212386 A1 | 9/2006 | Willey et al. | |
| 2009/0037323 A1* | 2/2009 | Feinstein | G06Q 40/00 705/38 |
| 2009/0222377 A1* | 9/2009 | Choudhuri | G06Q 40/02 705/38 |
| 2009/0299911 A1* | 12/2009 | Abrahams | G06Q 40/00 705/36 R |
| 2010/0217732 A1* | 8/2010 | Yang | G06N 20/00 706/21 |
| 2011/0173116 A1* | 7/2011 | Yan | G06Q 40/02 705/38 |
| 2011/0270740 A1 | 11/2011 | Pickett | |
| 2012/0191596 A1 | 7/2012 | Kremen et al. | |
| 2013/0143644 A1 | 6/2013 | Luchene | |
| 2013/0297489 A1* | 11/2013 | Showalter | G06Q 40/025 705/38 |
| 2014/0222737 A1* | 8/2014 | Chen | G06N 20/20 706/12 |
| 2014/0279387 A1 | 9/2014 | Shifman et al. | |
| 2015/0026035 A1 | 1/2015 | Showalter | |
| 2015/0134483 A1 | 5/2015 | Barenblatt | |
| 2015/0269668 A1* | 9/2015 | Gil | G06Q 40/025 705/38 |
| 2016/0104238 A1 | 4/2016 | Loganathan et al. | |
| 2017/0091861 A1 | 3/2017 | Bianchi et al. | |
| 2018/0260891 A1* | 9/2018 | Merrill | G06Q 40/02 |
| 2019/0130481 A1* | 5/2019 | Fahner | G06Q 40/025 |

FOREIGN PATENT DOCUMENTS

| | | | |
|---|---|---|---|
| WO | WO-02097563 A2 * | 12/2002 | G06Q 20/04 |
| WO | WO-2012018968 A1 * | 2/2012 | G06Q 40/025 |
| WO | WO-2016084642 A1 * | 6/2016 | G06Q 40/02 |

OTHER PUBLICATIONS

Jiang et al., "The Applied Research of Credit Scoring Combination Model Based on Sa-GA Algorithm," Fourth International Conference on Business Intelligence and Financial Engineering, IEEE, 2011 (Year: 2011).*
Anonymous, "6 Keys to Credit Risk Modeling for the Digital Age," SAS Publication, 2018 (Year: 2018).*
International Application No. PCT/US2018/064698, International Search Report and Written Opinion, dated Apr. 5, 2019, 14 pages.
U.S. Appl. No. 15/783,944, Non-Final Office Action dated Mar. 2, 2021, 69 pages.
PCT Application No. PCT/US2018/055727, International Search Report and Written Opinion, dated Dec. 6, 2018, 19 pages.
U.S. Appl. No. 15/783,944, Office Action, dated Aug. 27, 2019, 45 pages.
U.S. Appl. No. 15/783,944, Final Office Action, dated Feb. 12, 2020, 66 pages.
U.S. Appl. No. 15/861,659, Final Office Action dated Nov. 25, 2020, 30 pages.
U.S. Appl. No. 15/861,659, Non-Final Office Action dated Apr. 3, 2020, 29 pages.
Canadian Patent Application No. 3,079,657, Office Action dated May 26, 2021, 6 pages.
European Patent Application No. 18866766.1, Extended Search Report dated May 17, 2021, 7 pages.
U.S. Appl. No. 15/861,659, Office Action dated Apr. 29, 2021, 29 pages.

* cited by examiner

CENTRALIZED MODEL FOR LENDING RISK MANAGEMENT SYSTEM

BACKGROUND

Consumer may occasionally need to borrow small amounts of money for a short amount of time to maintain financial sustainability. While most consumers have access to the financial services and products offered by financial institutions such as banks and credit unions, traditional lending practices of such financial institutions are not well suited to provide such small dollar value, short-term loans to consumers. These traditional lending practices are generally designed to provide long-term loans of relatively large amounts of funds for major goals based on collateral of valuable assets owned by the consumers. Additionally, these traditional lending practices may rely on time-consuming and lengthy credit worthiness checks, in many cases even when the consumers are existing customers of the financial institutions, which are impractical for meeting the immediate cash needs of consumers. As a result, some consumers who desire small short-term loans may be forced to turn to third-party lenders that do not view the consumers as long-term customers, and who also do have any incentive to educate the consumers in the responsible use of credit.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
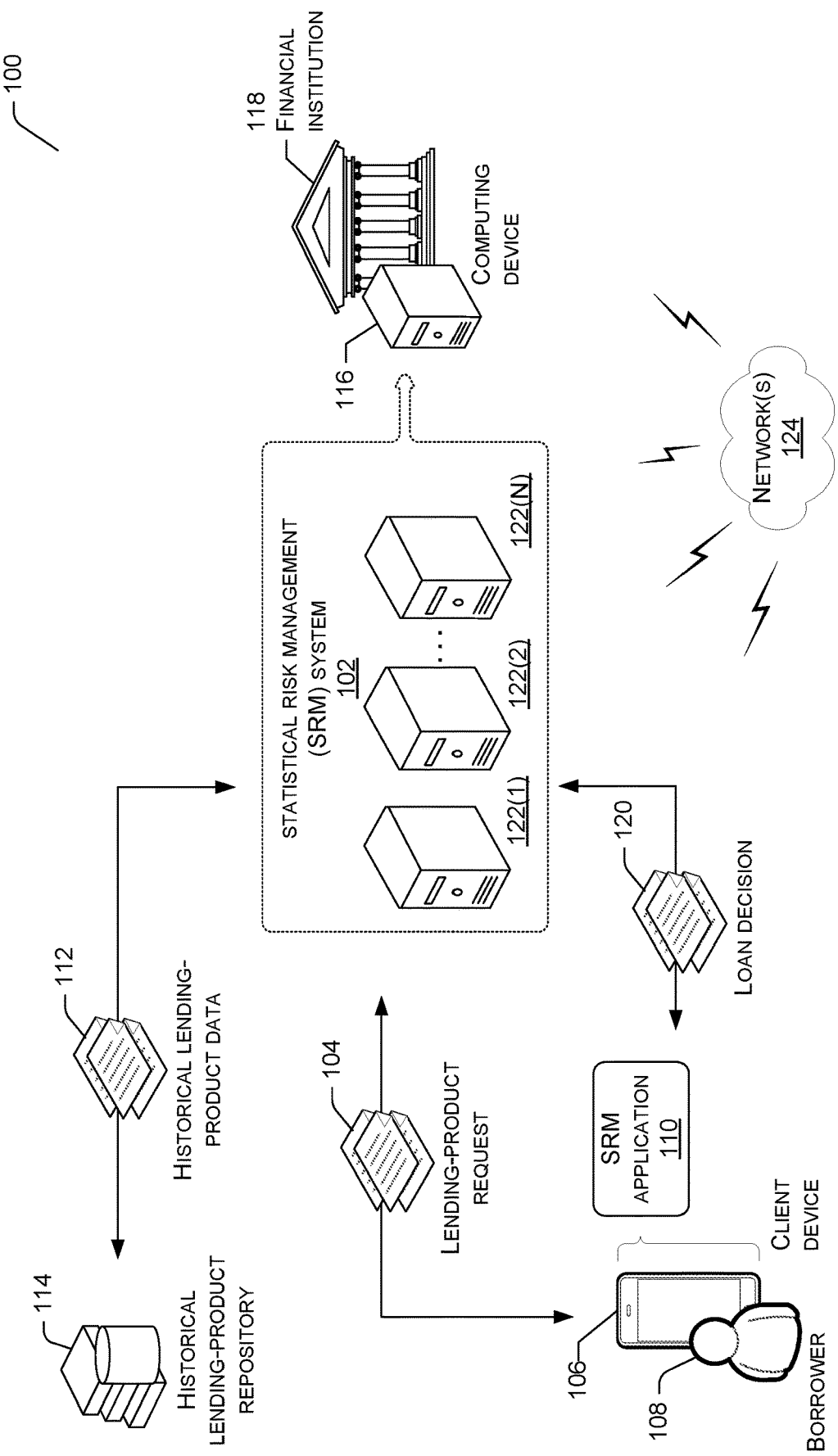
FIG. 1 illustrates a schematic view of a computing environment that facilitates an analysis of a lending-product request via a Statistical Risk Management (SRM) system.

This disclosure describes techniques for selectively using a heuristic model or a statistical model to analyze relationship attributes of a borrower to determine whether to approve or deny a lending-product request. More specifically, a Statistical Risk Management (SRM) system is described that determines a probability of a borrower repaying a loan over a predetermined time, and avoiding being charged off. A charge-off is a declaration by a creditor that an amount of debt is unlikely to be collected. In one example, a charge-off may occur when a borrower becomes delinquent on a repayment of the loan amount for predetermined time-period, such as 30-days. However, any predetermined time period is possible The SRM system may approve or deny various types of lending-product requests based on various criteria such as a borrower's loan qualification, the loan amount solicited by the borrower, and the intended purpose of the loan amount. In one example, approval of a lending-product request may be based on a combination of a borrower's loan qualification and the loan amount solicited by the borrower. While a borrower may solicit any loan amount, the SRM system may be configured such that different loan amounts invite different gradations of heuristic or statistical analyses. For example, a financial institution may consider a loan amount of $500 to be low-risk, and thus attract a heuristic analysis of the borrower's loan qualification. Alternatively, a loan amount of $5,000 may be considered a high-risk in terms of being charged-off, and thus attract a different gradation of a heuristic analysis or a statistical analysis of the borrower's loan qualification.

In another example, approval of a lending-product request may be based on a combination of a borrower's loan qualification and the intended purpose of the loan. A lending-product request for the purchase of an automobile may invite a different gradation of heuristic analysis or statistical analysis for a loan intended for a recreational vehicle.

Additionally, the SRM system determine the approval of a lending-product request by comparing a charge-off probability score associated with the lending-product request and an approval cutoff threshold. The approval cutoff threshold can be set up an operator of the SRM system as a method of managing a loan portfolio risk.

In one example, the SRM system may receive a lending-product request from a borrower. A borrower may initiate a lending-product request from an online portal that is operated by a financial institution using a web browser installed on a client device. The client device may access the online portal via a local area network (LAN), a larger network such as a wide area network (WAN), or a collection of networks, such as the Internet. The online portal may provide a loan request interface page that enables the borrower to initiate a loan request. The loan request interface page may be configured to permit the borrower to initiate the lending-product request after the borrower has submitted authentication credentials that authenticates an identity of the borrower as an existing customer of the financial institution. Alternatively, the borrower may initiate a lending-product request via a SRM application that is native to the client device, and communicatively coupled to the SRM system.

In various examples, the borrower may submit a lending-product request that includes a borrower identifier, a lending-product identifier, a loan amount, or any combination thereof. The borrower identifier may be used to retrieve client profile data associated with the borrower from a repository that is maintained by, or on behalf of, the SRM system. The client profile data may further include relationship attributes that describe observable characteristics of the borrower's relationship with a financial institution. Alternatively, or additionally, the SRM system may retrieve relationship attributes from a relationship attribute repository that is maintained by, or on behalf of, the SRM system.

In a non-limiting example, relationship attributes may include a length of relationship of the borrower with the financial institution, a payment history that includes the number of times the borrower paid open and closed loan payments on time, a direct deposit history that includes the number of direct deposits for which the borrower is a primary account holder, electronic transaction history that includes the number of electronic transactions for which the borrower is a primary account holder, and an aggregated deposit balance during a predetermined transaction period.

The lending-product identifier may identify categories of lending-products based on an intended purpose for the lending-product. For example, financial institutions may selectively offer different terms of repayment for a lending-product (i.e., repayment period, interest rate, deposit amount, penalties for default payments, etc.) based on the intended purpose of the lending-product. For example, a lending-product that is intended for use in purchasing an automobile may have more favorable terms (i.e., interest rate, deposit amount) relative to a lending-product that is intended to purchase a recreational vehicle. Moreover, categories of lending-products may include, but are not limited to, automobiles, recreational vehicles, marine vehicles, financing repayment of outstanding health expenses, household expenses, or any other type of personal or business expense.

In response to receiving a lending-product request, the SRM system may determine whether to approve or deny the lending-product request based on a heuristic model analysis or a statistical model analysis. In one example, a heuristic model analysis includes assigning a select number of relationship attributes with a numerical score based on a relative value of the borrower's relationship attribute. For example, a borrower's 11-year length of relationship may equate to a numerical score of 5 on a scale of 1 to 5; the numerical score of 5 being the upper-limit of benefit that may be assigned to a length of relationship, attribute. It is noteworthy that a numerical scale of 1 to 5 is used for exemplary purposes only. Any numerical scale is possible.

In doing so, the heuristic model analysis involves generating a loan qualifier score for the borrower based on a mathematical combination of the numerical scores for the select number of relationship attributes, along with other criteria such as a loan amount, or an intended purpose of the lending-product. In this example, the SRM system may approve the lending-product request based at least in part on the loan qualifier score being greater than a predetermined heuristic threshold. The predetermined heuristic threshold may be set by an administrator of the SRM system and intended to approve lending-product requests for low-risk borrowers, low-risk lending-products, or a combination of both. For example, the predetermined heuristic threshold may be influenced by an intended purpose of the lending-product request, the loan amount, or a combination of both.

In some examples, the SRM system may determine that the loan qualify score for the borrower is less than the predetermined heuristic threshold. In doing so, the SRM system may generate one or more statistical models to determine whether to approve the lending-product request. In one example, the SRM system may retrieve historical lending-product data for a plurality of borrowers. The historical lending-product data may be maintained by the SRM system within a historical lending-product data repository. Alternatively, or additionally, the historical lending-product data may be maintained by a financial institution or a third-party service provider on behalf of the SRM system or the financial institution.

The historical lending-product data may include client profile data associated with a plurality of borrowers that submitted lending-product requests over a predetermined time period. The historical lending-product data may further include historical records of corresponding lending-products, historical records lending-product request denials, historical records of actual charge-offs (i.e., defaults) associated with approved lending-product requests, or any combination thereof.

The SRM system may selectively generate a statistical model based on the historical lending-product data. More specifically, the SRM system may select a random sample set of lending-product data from within the historical lending-product data. In some examples, the SRM system may apply a correction for selection bias within the historical lending-product data, based on an incomplete randomness in the sample set of borrowers.

Additionally, the SRM system may selectively generate a plurality of statistical models by first parsing through the historical lending-product data to generate a plurality of subsets of the historical lending-product data. In doing so, the SRM may generate an individual statistical model for each subset of historical lending-product data. In one example, an administrator of the SRM system may identify a selection bias for subsets of historical lending-product data based on shared characteristics of a lending-product request or relationship attributes of a borrower. For example, shared characteristics of a lending-product request may include, but is not limited to, a loan amount, a lending-product category (i.e., intended purpose of lending-product request), or a combination of both. Similarly, shared characteristics of relationship attributes of a borrower may include, but is not limited to, a geographic location, portions of client profile data (i.e., employment status, income bracket, etc.). Alternatively, or additionally, the SRM system may detect and recommend a selection bias for subsets of historical lending-product data based on a disparity of correlations between a plurality of existing, statistical models.

Each statistical model may provide a set of relationship attribute coefficients that are useful for determining whether borrowers are able to repay their loans. Relationship attribute coefficients may include an aggregate deposit (Dep) coefficient, one or more length of relation (LoR) coefficients, one or more payment history (PayH) coefficients, a direct deposit (DirDep) coefficient, an electronic transactions (ElecTr) coefficient, a banking product (Prod) coefficient, a bill pay coefficient (BillPay), an affiliate coefficient (Aff), or any combination thereof.

In response to generating one or more statistical models and the ensuing relationship attribute coefficients, the SRM system may generate individual borrower intermediate scores based on analyses of a borrower's relationship attributes relative to relationship attribute coefficients of each statistical model. The borrower intermediate score may reflect a likelihood of the borrower repaying the loan amount associated with the lending-product request.

Additionally, the SRM system may calculate a charge-off probability score of the borrower not defaulting (i.e., charging-off) on payment associated with a lending-product for a predetermined time, based on each intermediate borrower score. In one example, the SRM system may apply a distribution function, such as a Standard Normal Cumulative Distribution Function (CDF), to an intermediate borrower score to calculate the charge-off probability score.

Moreover, the SRM system may selectively calculate an overall charge-off probability score for a lending-product request based on the plurality of charge-off probability scores. In one example, the SRM system may determine an overall charge-off probability score by determining a mean-value or median-value of the plurality of charge-off probability scores. Alternatively, the SRM system may select a lowest-value charge-off probability score as the overall charge-off probability score.

In any case, the SRM system may compare the overall charge-off probability score with an approval cutoff threshold to determine whether to approve or deny the lending-product request. In one example, SRM system may determine that the overall charge-off probability score is greater than or equal to the approval cutoff threshold. In this example, the SRM system may approve the lending-product request and transmit a message to a client device of the borrower, indicating that the lending-product request has been approved. Alternatively, the SRM system may determine that the overall charge-off probability is less than the approval cutoff threshold, and further transmit a message to the client device indicating the denial of the lending-product request.

The approval cutoff threshold may be used as a method of balancing a lending-product portfolio risk versus return. Raising a value of the approval cutoff threshold may lead to a lower rate of default (i.e., charge-offs) of approved loans, but may also reduce the volume of approved lending-product requests. Alternatively, lowering the value of the approval cutoff threshold may increase a number of defaults (i.e., charge-offs) of approved loans, but increase the volume of approved lending-product requests. In various examples, the SRM system may monitor the volume and rate of defaults of an existing lending-product portfolio to determine whether a change to an approval cutoff threshold may support a revenue-based and/or profit-based target. The SRM system may use one or more trained machine learning models to monitor an existing lending-product portfolio and adjust the approval cutoff threshold. Alternatively, an administrator of the SRM system may adjust the approval cutoff threshold, via a user interface module.

In the illustrated example, the SRM system may validate the accuracy of a statistical model using an independent set of historical lending-product data that is different from historical lending-product data used to generate the statistical model. For example, the SRM system may retrieve, from one or more third-party services, the independent set of historical lending-product data that is associated with a plurality of borrowers. The independent set of historical lending-product data may include a same type of data that is used to generate the statistical model, such as client profile data associated with a plurality of borrowers that submitted lending-product requests over a predetermined time period, historical records of corresponding lending-products, historical records lending-product request denials, historical records of actual charge-offs (i.e., defaults) associated with approved lending-product requests, or any combination thereof.

Thus, the SRM system may parse through the independent set of historical lending-product data and select a set of relationship attributes associated with an independent historical lending-product request previously submitted by a borrower. In this example, the SRM system may use the statistical model being validated to calculate a borrower intermediate score for the independent historical lending-product request, based on the borrower's relationship attributes. The SRM system may further calculate a charge-off probability score of the borrower not defaulting (i.e., charging-off) on payment associated with the independent historical lending-product request, and in doing so, compare the charge-off probability score with an actual record of whether the borrower did in fact default on payment of the historical lending-product.

In this way, the SRM system may generate an accuracy score for the statistical model using an independent set—or subset—of independent historical lending-product data, and further determining whether the statistical model correctly predicts a borrower's default or on-time payment. The accuracy score may be an alpha-numeric expression (i.e., 0 to 10, or A to F), a descriptive expression (i.e., low, medium, or high), based on color (i.e., red, yellow, or green), or any other suitable scale that reflects a degree of correlation charge-off probability score generated by the statistical model and the actual record of a borrower's default or on-time loan payment.

Moreover, the SRM system may selectively determine whether the accuracy score of the statistical model is equal to or greater than a predetermined accuracy threshold. The predetermined accuracy threshold may be a mean-value accuracy score (i.e., 5, C, medium, or yellow), or any other accuracy score that is set by an administrator of the SRM system. The predetermined accuracy threshold may reflect an accurate correlation of some, but not all, of independent historical lending-product requests associated with the set of independent lending-product data.

In response to determining that the accuracy score is greater than the predetermined accuracy threshold, the SRM system may continue to use the statistical model, as validated, to determine whether to approve or deny future lending-product request. In some examples, the SRM system may determine that the accuracy score of the statistical model is less than the predetermined accuracy threshold. In these instances, the SRM system may re-generate the statistical model based on a revised set of historical lending-product data that includes the independent set of historical lending-product data, or another updated set of historical lending-product data.

In the illustrated example, the SRM system may further generate a hybrid statistical model by combining subsets of historical lending-product data associated with one or more statistical models. For example, the SRM system may concurrently execute a plurality of statistical models. Each individual statistical model may be based on a different subset of historical lending-product data that is biased towards different, borrower characteristics.

The SRM system may further generate an accuracy score for each statistical model to determine whether each statistical model correctly predicts a borrower's default or on-time payment. In this way, the SRM system may select a portion of the total number of statistical models, based at least in part on their relative accuracy scores. In one example, the SRM system may select an n-number [any integer number], but not all, of the total number of statistical models with the highest relative accuracy score. In another example, the SRM system may select an n-number of statistical models with accuracy scores that are greater than or equal to a predetermined accuracy threshold.

In doing so, the SRM system may create an aggregate subset of historical lending-product data by selectively combining the subsets of historical lending-product data of the selected statistical models. In this way, the SRM system may further generate a hybrid statistical model using the aggregate subset of historical lending-product data.

Further, the term "techniques," as used herein, may refer to system(s), method(s), computer-readable instruction(s), module(s), algorithms, hardware logic, and/or operation(s) as permitted by the context described above and through the document.

FIG. 1 illustrates a schematic view of a computing environment 100 that facilitates an analysis of a lending-product request via a Statistical Risk Management (SRM) system 102. The SRM system 102 may receive a lending-product request 104 from a client device 106 associated with a borrower 108. In some examples, the borrower 108 may submit the lending-product request 104 via a SRM application 110 native on the client device 106. Alternatively, the borrower 108 may submit the lending-product request 104 via an online portal that is operated by a financial institution, using a web browser installed on the client device 106. The lending-product request 104 may include a borrower identifier, a lending-product identifier, a loan amount, or any combination thereof.

In one example, the SRM system 102 may retrieve client profile data associated with the borrower 108 from a client profile data-store maintained by the SRM system 102. In doing so, the SRM system 102 may generate a loan qualifier score for the borrower 108 based at least in part on the lending-product request 104, and further determine whether to approval the lending-product request 104 based via a heuristic model analysis.

In some examples, the SRM system 102 may determine that a statistical model analysis is required to determine whether the lending-product request may be approved, based on the loan qualifier score being less than a predetermined heuristic threshold. In these instances, the SRM system 102 may retrieve historical lending-product data 112 from a historical lending-product repository 114, and in doing so, generate one or more statistical models to analyze the lending-product request 104. The historical lending-product repository 114 may be a repository that is maintained by the SRM system 102, a computing device 116 of a financial institution 118, a third-party service provider on behalf of the financial institution 118, or any combination thereof.

In some examples, the SRM system 102 may analyze the lending-product request 104 via one statistical model, a combination of statistical models, or a hybrid statistical model that aggregates subsets of historical lending-product data from multiple statistical models. In this way, the SRM system 102 may determine an approval of the lending-product request, based on a charge-off probability score relative to an approval cutoff threshold. The SRM system 102 may then generate and transmit a loan decision 120 to the client device 106 informing the borrower 108 of an approval or denial of the lending-product request 104.

In the illustrated example, the client device 106 may correspond to any sort of electronic device operating on the telecommunications network, such as a cellular phone, a smart phone, a tablet computer, an electronic reader, a media player, a gaming device, a personal computer (PC, a laptop computer), etc. The client device 106 may have a subscriber identity module (SIM), such as an eSIM, to identify the respective electronic device to a telecommunications service provider network (also referred to herein as "telecommunications network").

Additionally, the SRM system 102 may operate on one or more distributed computing resource(s). The one or more distributed computing resource(s) may include one or more computing device(s) 122(1)-122(N) that operate in a cluster or other configuration to share resources, balance load, increase performance, provide fail-over support or redundancy, or for other purposes. The one or more computing device(s) 122(1)-122(N) may include one or more interfaces to enable communications with other networked devices, such as the client device 106, the financial institution 118, via one or more network(s) 124.

The one or more network(s) 124 may include public networks such as the Internet, private networks such as an institutional and/or personal intranet, or some combination of private and public networks. The one or more network(s) 124 can also include any type of wired and/or wireless network, including but not limited to local area network (LANs), wide area networks (WANs), satellite networks, cable networks, Wi-Fi networks, Wi-Max networks, mobile communications networks (e.g., 3G, 4G, and so forth), or any combination thereof.

Figure 2:
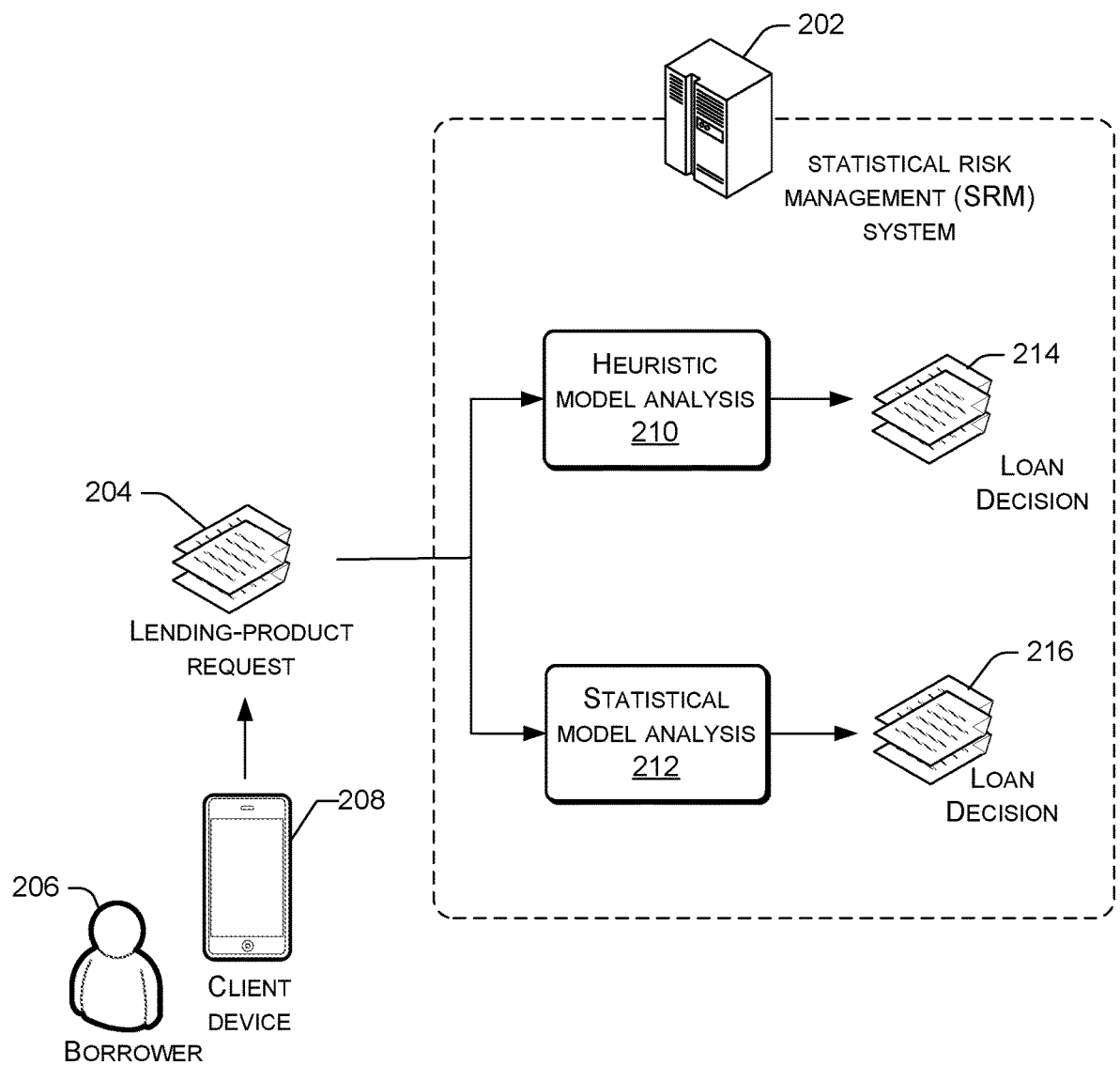
FIG. 2 illustrates a block diagram of a SRM system that is configured to select a heuristic model analysis or a statistical model analysis to determine whether to approve a lending-product request.

FIG. 2 illustrates a block diagram of a SRM system 202 that is configured to select a heuristic model analysis or a statistical model analysis to determine whether to approve a lending-product request 204. More specifically, a borrower 206 may generate and transmit a lending-product request 204 to the SRM system 202 via a client device 208. The lending-product request 204 may include at least one of a borrower identifier, a lending-product identifier, or a loan amount. In doing so, the SRM system 202 may retrieve relationship attributes associated with the borrower 206, based at least in part on the lending-product request 204. The SRM system 202 may retrieve the relationship attributes from a client profile data repository or a relationship attribute repository native to the SRM system 202.

In some examples, the SRM system 202 may perform a heuristic model analysis 210 to determine whether to approve the lending-product request 204. In some examples, the SRM system 202 may selectively bypass the heuristic model analysis 210 based at least in part on one or more criteria, and automatically perform a statistical model analysis 212 of the lending-product request 204. The one or more criteria may relate to the intended purpose for the lending-product, the loan amount, or a relationship attribute of the borrower. In one example, one criteria may stipulate that a lending-product request 204 intended for certain depreciating assets, such as recreational vehicles, are analyzed using a statistical model analysis 212. In another example, one criteria may also indicate that loan amounts above a predetermined value are to be analyzed using a statistical model analysis 212. In yet another example, one criteria may state that lending-product requests associated with borrowers that have a length of relationship with a financial institution (i.e., relationship attribute) that is less than a predetermined number of years, are to be analyzed using a statistical model analysis 212.

In the illustrated example, the SRM system 202 may selectively perform the heuristic model analysis and generate a loan qualifier score for the borrower 206. The loan qualifier score may correspond to a mathematical combination of numerical scores for a select number of relationship attributes, along with one or more other criteria such as a loan amount and an intended purpose of the lending-product. The SRM system 202 may assign a numerical score to each relationship attribute and/or criteria relative to a predetermined scale. In one example, the SRM system 202 may assign a numerical score of 2 on a scale of 1 to 5 for a loan amount that is greater than a predetermined amount. The numerical score of 2 may indicate that the loan amount is considered a high-risk value. Similarly, the SRM system 202 may assign a numerical score of 4 on scale of 1 to 5 to a lending-product that is intended for purchase of a commuter vehicle, indicating that the intended purpose of the lending-product is considered low-risk.

In response to generating a loan qualifier score, the SRM system 202 may compare the loan qualifier score with a predetermined heuristic threshold. In one example, the SRM system 202 may generate a loan decision 214 for the lending-product request 204 based at least in part on the loan qualifier score being greater than or equal to the predetermined heuristic threshold. The loan decision 214 may correspond to a loan approval or a loan denial. In another example, the SRM system 202 may determine that the loan qualifier score is less than the predetermined heuristic threshold. In doing so, the SRM system may analyze the lending-product request 204 via a statistical model analysis 212, and further generate a corresponding, loan decision 216 to approve or deny the lending-product request 204.

Figure 3:
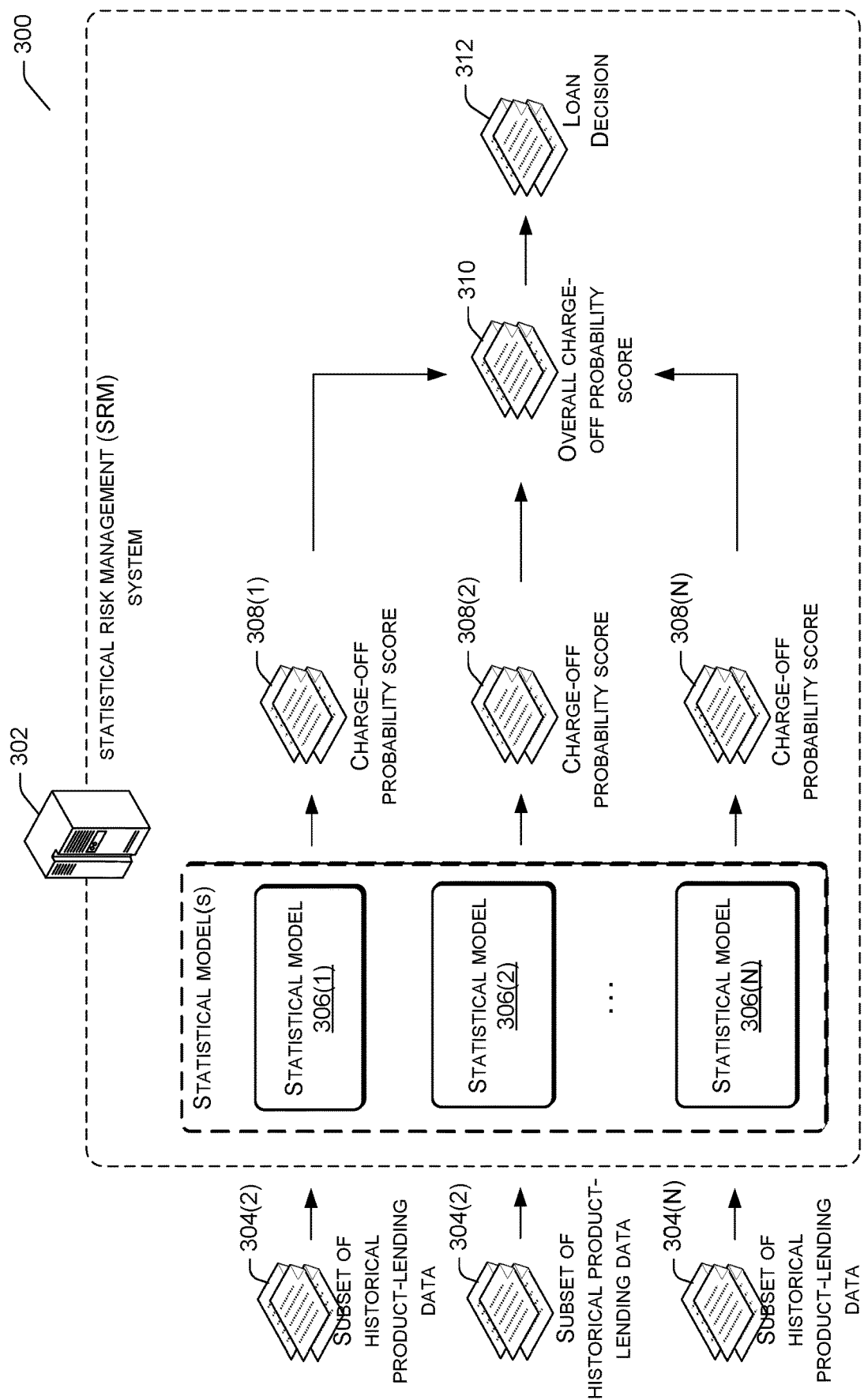
FIG. 3 illustrates a block diagram of a SRM system that is configured to concurrently execute a plurality of statistical models to determine whether to approve a lending-product request.

FIG. 3 illustrates a block diagram of a SRM system 302 that is configured to concurrently execute a plurality of statistical models to determine whether to approve a lending-product request. In some examples, the SRM system 302 may parse through a set of historical lending-product data to generate one or more subset(s) of historical lending-product data 304(1)-304(N). Each subset of historical lending-product data 304(1)-304(N) may share similar characteristics that include geographic location, portions of client profile data (i.e., employment status, income bracket, etc.), lending-product category (i.e., intended purpose of a lending-product), loan amount, or any combination thereof.

Moreover, the SRM system 302 may generate a plurality of statistical model(s) 306(1)-306(N) based on the one or more subset(s) of historical lending-product data 304(1)-304(N). In other words, each subset of historical lending-product data 304(1)-304(N) may be used to generate corresponding, statistical model(s) 306(1)-306(N).

In response to generating the plurality of statistical model(s) 306(1)-306(N), the SRM system 302 may generate corresponding, charge-off probability score(s) 308(1)-308(N) for individual statistical models of the plurality of statistical model(s) 306(1)-306(N). The charge-off probability score(s) 308(1)-308(N) may then be used to generate an overall charge-off probability score 310 upon which to base a loan decision 312 (i.e., approval or denial) for a lending-product request. The overall charge-off probability score 310 may correspond to a mean-value or median value of the charge-off probability score(s) 308(1)-308(N). Alternatively, the SRM system 302 may determine the overall charge-off probability score 310 by selecting a lowest-value of the charge-off probability score(s) 308(1)-308(N).

In the illustrated example, the SRM system 302 may generate a loan decision 312 by comparing the overall charge-off probability score 310 with an approval cutoff threshold. The SRM system 302 may approve a lending-product request based on the overall charge-off probability score 310 being greater than or equal to an approval cutoff threshold. Alternatively, the SRM system 302 may deny a lending-product request based on the overall charge-off probability score 310 being less than the approval cutoff threshold.

Figure 4:
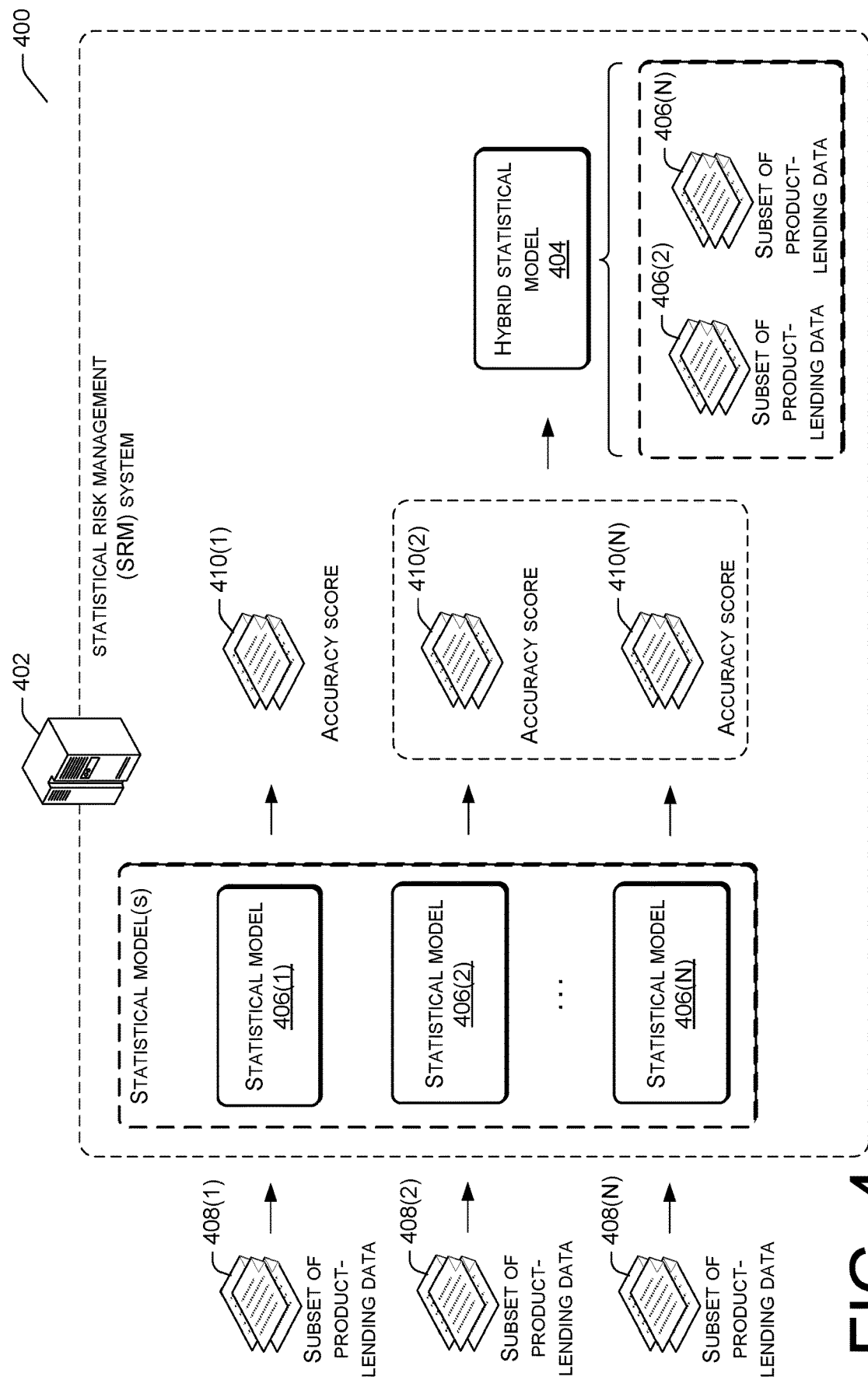
FIG. 4 illustrates a block diagram of a SRM system that is configured to generate a hybrid statistical model based on a subset of statistical models.

FIG. 4 illustrates a block diagram of a SRM system 402 that is configured to generate a hybrid statistical model 404 based on a plurality of statistical models 406(1)-406(N). In various examples, the SRM system may generate a hybrid statistical model 404 by aggregating a selection of multiple subsets of historical lending-product data.

In the illustrated example, the SRM system 402 may selectively generate the plurality of statistical models 406(1)-406(N), based on individual subsets of historical lending-product data 408(1)-408(N). Each subset of historical lending-product data 408(1)-408(N) may be based on a selection bias of shared borrower or lending-product characteristics within a set of historical lending-product data. For example, a selection bias of shared characteristics may include, but are not limited to, a geographic location, portions of client profile data (i.e., employment status, income bracket, etc.), lending-product category (i.e., an intended purpose of a lending-product), loan amount, or any combination thereof. In a non-limiting example, a subset of historical lending-product data may be biased towards on a particular lending-product category (i.e., automobile, recreational vehicle, marine vehicle, etc.) within the set of historical lending-product data. In another non-limiting example, a subset of historical lending-product data may be biased towards a particular geographic location within the set of historical lending-product data.

In response to generating the plurality of statistical model(s) 406(1)-406(N), each based on an individual subset of historical lending-product data 408(1)-408(N), the SRM system 402 may execute each statistical model and determine corresponding accuracy score(s) 410(1)-410(N). An accuracy score is intended to quantify the degree to which a statistical model correctly predicts a borrower's default or on-time loan payment (i.e., charge-off probability score). The SRM system 402 may generate each accuracy score using an independent of historical lending-product data that is different from each subset of historical lending-product data 408(1)-408(N) used to generate the statistical models.

In this way, the SRM system 402 may parse through the independent set of historical lending-product data and identify at least one independent historical lending-product request previously submitted by a borrower. The SRM system 402 may then execute the plurality of statistical model(s) 406(1)-406(N) to calculate borrower intermediate score(s), and ultimately charge-off probability score(s) that corresponds to the independent historical lending-product request. The charge-off probability score(s) may be compared with an actual record—from the independent set of historical lending-product data—of whether the borrower did in fact default on payment of the historical lending-product.

Moreover, the SRM system 402 may generate accuracy score(s) 410(1)-410(N) for each of the statistical model(s) 406(1)-406(N) based on whether the statistical model(s) 406(1)-406(N) correctly predict an actual charge-off or on-time payment of the historical lending-product. In some examples, the SRM system 402 may monitor the accuracy score(s) 410(1)-410(N) (i.e., by re-generating the accuracy scores) of the statistical model(s) 406(1)-406(N) to ensure that each accuracy score is greater than or equal to a predetermined accuracy threshold. The predetermined accuracy threshold may be set by an administrator of the SRM system 402. If the accuracy score of a statistical model is below the predetermined accuracy threshold, the SRM system 402 may selectively discontinue use of the statistical model. Alternatively, the SRM system 402 may replace the statistical model with another statistical model that is based on an alternate set of historical lending-product data. In one example, the alternate set of historical lending-product data may include the independent set of historical lending-product data used to generate the accuracy score.

The SRM system may monitor the accuracy score(s) 410(1)-410(N) of the statistical model(s) 406(1)-406(N) on a continuous basis, per a predetermined schedule, or in response to a triggering event. The predetermined schedule may correspond to any time interval, such as one day, one week, or one month. A triggering event may be initiated by an administrator of the SRM system 402, or an independent accounting of a predetermined number of inaccurate charge-off predictions made by the statistical model(s) 406(1)-406(N).

In the illustrated example, the SRM system 402 may generate the hybrid statistical model 404 by selecting a number of statistical models, based on their relative accuracy scores. In one example, the SRM system 402 may select a predetermined number of statistical models with the highest relative accuracy scores among the statistical models 406(1)-406(N). Alternatively, the SRM system 402 may select statistical models with an accuracy score above a predetermined hybrid accuracy threshold. The predetermined hybrid accuracy threshold may be set by an administrator of the SRM system 402, and be substantially similar to the predetermined accuracy threshold that is used to determine whether to selectively discontinue use of a statistical model. Alternatively, the predetermined hybrid accuracy threshold maybe different from the predetermined accuracy threshold.

In response to selecting a number of statistical models based on their relative accuracy scores, the SRM system 402 may create an aggregate subset of historical lending-product data by combining the subsets of historical lending-product data associated each of the selected statistical models. In this way, the SRM system 402 may generate a hybrid statistical model 404 based on the aggregate subset of historical lending-product data.

Figure 5:
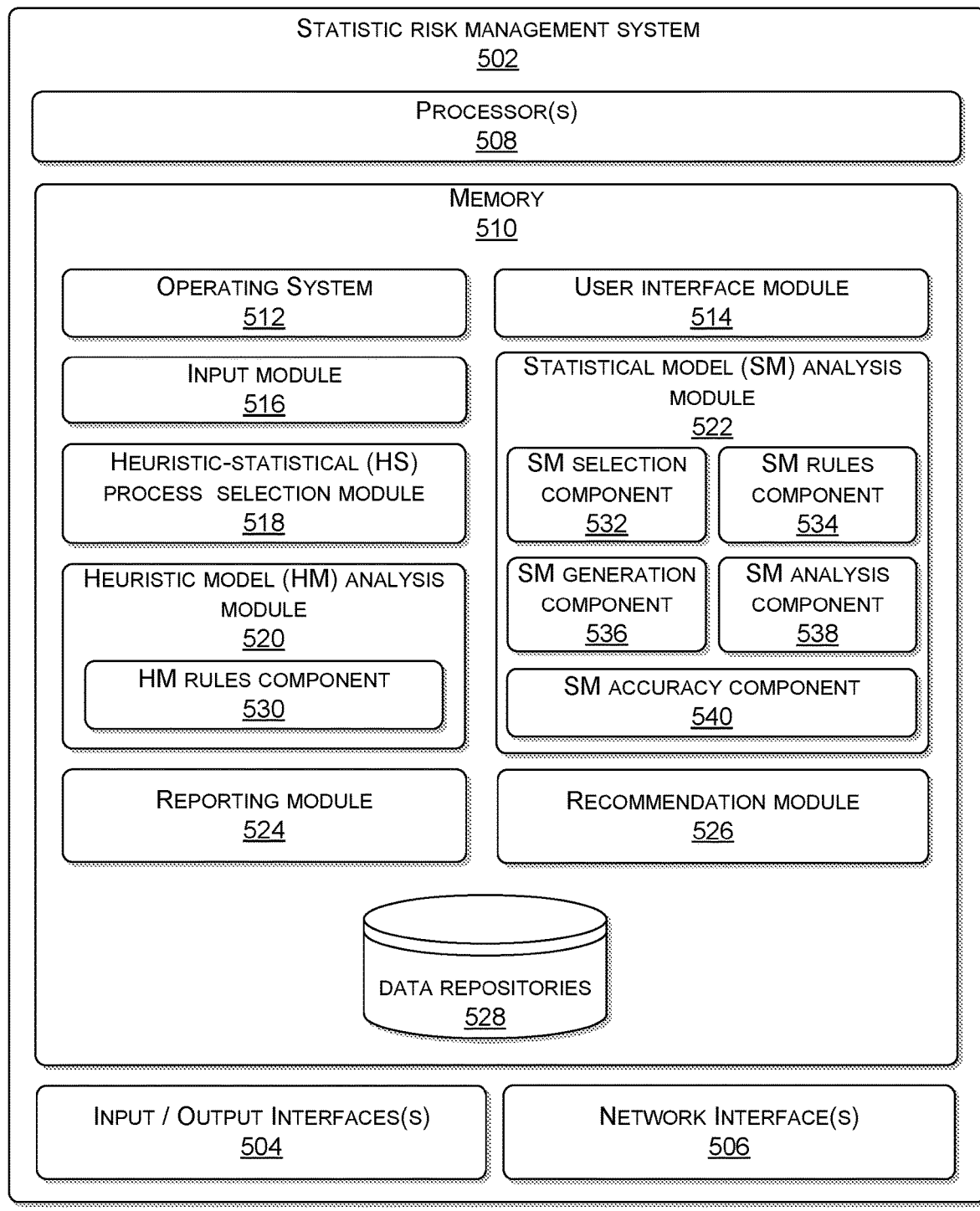
FIG. 5 illustrates a block diagram showing various components of a SRM system that is configured to analyze a lending-product request.

FIG. 5 illustrates a block diagram showing various components of a SRM system that is configured to analyze a lending-product request. In the illustrated example the SRM system 502 may include routines, program instructions, objects, and/or data structures that perform particular tasks or implement abstract data types. Further, the SRM system 502 may include input/output interface(s) 504. The input/output interface(s) 504 may include any type of output interface known in the art, such as a display (e.g., a liquid crystal display), speakers, a vibrating mechanism, or a tactile feedback mechanism. Input/output interface(s) 504 also include ports for one or more peripheral devices, such as headphones, peripheral speakers, or a peripheral display. Further, the input/output interface(s) 504 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the SRM system 502 may include network interface(s) 506. The network interface(s) 506 may include any sort of transceiver known in the art. For example, the network interface(s) 506 may include a radio transceiver that performs the function of transmitting and receiving radio frequency communications via an antenna. In addition, the network interface(s) 506 may also include a wireless communication transceiver and a near field antenna for communicating over unlicensed wireless Internet Protocol (IP) networks, such as local wireless data networks and personal area networks (e.g., Bluetooth or near field communication (NFC) networks). Further, the network interface(s) 506 may include wired communication components, such as an Ethernet port or a Universal Serial Bus (USB).

Further, the SRM system 502 may include one or more processor(s) 508 that are operably connected to memory 510. In at least one example, the one or more processor(s) 508 may be a central processing unit(s) (CPU), graphics processing unit(s) (GPU), a both a CPU and GPU, or any other sort of processing unit(s). Each of the one or more processor(s) 508 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 508 may also be responsible for executing all computer applications stored in the memory, which can be associated with common types of volatile (RAM) and/or nonvolatile (ROM) memory.

In some examples, memory 510 may include system memory, which may be volatile (such as RAM), non-volatile (such as ROM, flash memory, etc.) or some combination of the two. The memory may also include additional data storage devices (removable ad/or non-removable) such as, for example, magnetic disks, optical disks, or tape.

The memory 510 may further include non-transitory computer-readable media, such as volatile and nonvolatile, removable and non-removable media implemented in any method or technology for storage of information, such as computer readable instructions, data structures, program modules, or other data. System memory, removable storage and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 510 may include an operating system 512, a user-interface module 514, an input module 516, a Statistical (HS) process selection module 518, a heuristic-model (HM) analysis module 520, a statistical model (SM) analysis module 522, a reporting module 524, a recommendation module 526, and one or more data repositories 528. The operating system 512 may be any operating system capable of managing computer hardware and software resources.

The input module 516 may be configured to receive a borrower's lending-product request. In some examples, the input module 516 may receive a lending-product request from an online portal operated by a financial institution. A borrower may access the online portal via a web browser installed on the client device. Alternatively, or additionally, the input module 516 may receive a lending-product request directly from a SRM application native on a borrower's client device. Further, the input module 516 may receive sets of historical lending-product data from a third-party service provider, or financial institution, for the purpose of generating statistical models, or validating an accuracy of existing statistical models.

The HS process selection module 518 may be configured to determine whether to conduct an initial analysis of a lending-product request via a heuristic model analysis or a statistical model analysis. In one example, the HS process selection module 518 may include one or more criteria that selectively bypass a heuristic model analysis, and instead, automatically perform a statistical model analysis. The one or more criteria may be configured by an administrator of the SRM system, via the user-interface module 514, and may relate to the intended purpose for the lending-product, the loan amount, or a relationship attribute of the borrower, or any combination thereof.

The HM analysis module 520 may be configured to perform a heuristic model analysis of a lending-product request. The HM analysis module 520 may further include a HM rules component 530. In one example, the HM analysis module 520 may generate a loan qualifier score for a borrower associated with a lending-product request. More specifically, the HM analysis module 520 may parse through the lending-product request to retrieve one or more characteristics of a lending-product request (i.e., loan amount, lending-product category) and one or more data repositories to retrieve a select number of relationship attributes of the borrower associated with the lending-product request. In doing so, the HM analysis module 520 may generate a loan qualifier score for the lending-product request based on one or more rules from the HM rules component 530.

The HM rules component 530 may include one or more rules that assign numerical scores to a select number of relationship attributes associated with a borrower, a select number of characteristics of a lending-product request, or a combination of both. For example, the HM analysis module 520 may assign one numerical score to a length of relationship of the borrower with a financial institution, a second numerical score for a loan amount associated with a lending-product request, and a third numerical score for an intended purpose of the lending-product request. The numerical score may be assigned on a numerical scale of 1 to 5, 1 to 10, or any other numerical scale. In the illustrated example, an increase in a numerical score favorably tends toward a loan approval decision.

Further, the HM rules component 530 may include one or more rules for generating a loan qualifier score by mathematically combining the numerical scores of the select number of relationship attributes, select number of characteristics of a lending-product request, or a combination of both.

The HM analysis module 520 may generate a loan qualifier score based on the one or more rules form the HM rules component 530. In doing so, the HM analysis module 520 may compare the loan qualifier score with a predetermined heuristic threshold to determine whether to approval the lending-product request. In some examples, the predetermined heuristic threshold may be stored in the HM rules component 530 and may be set by an administrator of the SRM system 502 via the user-interface module 514.

In one example, the HM analysis module 520 may approve the lending-product request based on the loan qualifier score being greater than or equal to the predetermined heuristic threshold. In this example, the HM analysis module 520 may transmit a message to the reporting module 524 indicating that the lending-product request is approved. In another example, the HM analysis module 520 may transmit an indication the HS process selection module 518 to analyze the lending-product request via a statistical model analysis, based at least in part on the loan qualifier score being less than the predetermined heuristic threshold.

In the illustrated example, the SM analysis module 522 may be configured to perform a statistical model analysis of a lending-product request. The SM analysis module 522 further includes an SM selection component 532, an SM rules component 534, an SM generation component 536, an SM analysis component 538, and a SM accuracy component 540.

The SM selection component 532 may be configured to determine whether to analyze the lending-product request using one statistical model or a plurality of statistical models. Further, the SM selection component 532 may also determine which statistical models to use for the statistical model analysis. In one example, the SM selection component 532 may parse through the lending-product request to retrieve one or more characteristics of the lending-product request (i.e., loan amount, lending-product category, and/or so forth). In doing so, the SM selection component 532 may identify one or more statistical models that were generated with a selection bias towards the loan amount or the lending-product category identified within the lending-product request. In a non-limiting example, the SM selection component 532 may parse through a lending-product request to identify a lending-product request for $1000 that is intended for a purchase of a marine vehicle (i.e., lending-product category). Thus, the SM selection component 532 may identify two relevant statistical models from a repository; a first statistical model that was generated with a selection bias of loan amounts that approximate $1000, and a second statistical model that was generated with a selection bias of a lending-product category for marine vehicles.

Similarly, the SM selection component 532 may retrieve, from one or more data repositories, a select number of relationship attributes of a borrower associated with the lending-product request. In this way, the SM selection component 532 may identify one or more statistical models that were generated with a selection bias towards the select number of relationship attributes of the borrower.

Additionally, the SM selection component 532 may filter selection of a statistical model based on an accuracy score indication from the SM accuracy component 540. For example, the SM accuracy component 540 component may transmit a message to the SM selection component 532 to continue use or discontinue use of a statistical model for analyses of lending-product requests.

SM rules component 534 may include one or more rules associated with analysis of a lending-product request via one or more statistical models. In one example, the SM rules component 534 may include a register of statistical models that were generated with a selection bias towards characteristics of a lending-product request or relationship attributes. Thus, the SM rules component 534 may include one or more rules that associate a lending-product request with one or more statistical models, based on a comparison of characteristics of the lending-product request or relationship attributes of the borrower, and the selection bias of the one or more statistical models.

Further, the SM rules component 534 may further include a register of statistical models that were generated without a selection bias of underlying date. In this example, the one or more rules may associate a lending-product request with one or more statistical models, based on an accuracy score of the statistical model, or some other criteria specified by an administrator of the SRM system 502. In some examples, the one or more rules may further indicate a predetermined accuracy threshold of statistical models. For example, the one or more rules may indicate that a statistical model may be used to analyze a lending-product request in response to an accuracy score for the statistical model being greater than or equal to the predetermined accuracy threshold. Additionally, the one or more rules may specify a calculation method for an overall charge-off probability score from a plurality of charge-off probability scores.

Moreover, the SM rules component 534 may include one or more thresholds used by the SM analysis module 522, such as but not limited to, a predetermined accuracy threshold, a predetermined hybrid accuracy threshold, and an approval cutoff threshold. Each of these one or more thresholds may be set by an administrator of the SRM system 502 via the user-interface module 514.

The SM generation component 536 may generate a statistical model, based on a set of historical lending-product data. In some examples, the SM generation component 536 may retrieve the set of historical lending-product data from a repository that is maintained by the SRM system 502, a financial institution, or a third-party service provider on behalf of the SRM system or the financial institution.

In doing so, the SM generation component 536 may selectively generate a statistical model based on the set of historical lending-product data. More specifically, the SRM system may select a random sample set of lending-product data from within the historical lending-product data. In some examples, the SRM system may apply a correction for selection bias within the historical lending-product data, based on an incomplete randomness in the sample set of borrowers.

In some examples, the SM generation component 536 may generate a plurality of statistical models by first parsing through the set of historical lending-product data to generate a plurality of subsets of the historical lending-product data. In some examples, each subset of historical lending-product data may be based on a selection bias of characteristics of a lending-product request or relationship attributes of a borrower. The selection bias of characteristics for a lending-product request may include a loan amount, a lending-product category. Similarly, the selection bias of characteristics for a borrower may include a geographic location, portions of client profile data (i.e., employment status, income bracket, etc.).

Further, the SM generation component 536 may selectively generate a hybrid statistical model by aggregating one or more subsets of historical lending-product data. The SM generation component 536 may rely on one or more rules from the SM rules component 534 to determine which subsets of historical lending-product data are to be aggregated. In one example, the SM generation component 536 may aggregate a number of subsets of historical lending-product data, based on relative accuracy scores of corresponding statistical models.

SM analysis component 538 may analyze a lending-product request using one or more statistical models. The SM analysis component 538 may generate a borrower intermediate score using each statistical model by analyzing a borrower's relationship attributes relative to relationship attribute coefficients associated with each statistical model. The borrower's intermediate score may reflect a likelihood of the borrower repaying the loan amount of the lending-product request.

The SM analysis component 538 may further calculate a charge-off probability score of the borrower not defaulting (i.e., charging-off) on payment associated with a lending-product for a predetermined time, based on each intermediate borrower score. In one example, the SM analysis component 538 may apply a distribution function, such as a Standard Normal Cumulative Distribution Function (CDF), to an intermediate borrower score to calculate the charge-off probability score.

In some examples, the SM analysis component 538 may selectively calculate an overall charge-off probability score in response to executing a plurality of statistical models. A determination of the overall charge-off probability score may be based on one or more rules within the SM rules component 534. The overall charge-off probability score may be based on a mean-value or a median-value of charge-off probability scores from each statistical model. Alternatively, the overall charge-off probability score may be a lowest-value charge-off probability score from among the plurality of statistical models.

Moreover, the SM analysis component 538 may compare a charge-off probability score (i.e., for an analysis using a single statistical model) or an overall charge-off probability score (i.e., for an analysis using multiple statistical models) with an approval cutoff threshold. In one example, the SM analysis component 538 may determine that the charge-off probability score or overall charge-off probability score is greater than or equal to the approval cutoff threshold. In this example, the SM analysis component 538 may transmit an indication to the reporting module 524 that the corresponding lending-product request is approved. Alternatively, the SM analysis component 538 may determine that the charge-off probability score or overall charge-off probability score is less than the approval cutoff threshold. In this latter example, the SM analysis component 538 may transmit an indication to the reporting module 524 that the corresponding lending-product request is denied.

In some examples, the SM analysis component 538 may determine whether an approval cutoff threshold that is used to determine whether to approve or deny a lending-product request supports a revenue-based and/or profit based target. In some examples, an administrator of the SRM system 502 may input a revenue-based or profit-based target via the user-interface module 514. In this example, the SM analysis component 538 may monitor the volume and rate of defaults of an existing lending-product portfolio to determine whether a change to an approval cutoff threshold may support the revenue-based and/or profit-based target. The SM analysis component 538 may use one or more trained machine learning models to monitor an existing lending-product portfolio and automatically adjust the approval cutoff threshold. Alternatively, the SM analysis component 538 may transmit a message to the recommendation module 526 indicating a recommended adjustment to the approval cutoff threshold. In doing so, an administrator of the SRM system 502 may selectively adjust the approval cutoff threshold, via the user-interface module 514.

The SM accuracy component 540 may be configured to determine an accuracy score for a statistical model. An accuracy score is intended to quantify the degree to which a statistical model correctly predicts a borrower's default or on-time loan payment (i.e., charge-off probability score). In one example, the SM accuracy component 540 may determine an accuracy score for a statistical model using an independent set—or subset—of independent historical lending-product data. For example, the SM accuracy component 540 may parse through an independent set of historical lending-product data and identify at least one independent historical lending-product request previously submitted by a borrower. The SM accuracy component 540 may retrieve a borrower's relationship attributes that are associated with the independent historical lending-product request from the independent set of historical lending-product data (i.e., client profile data), or a repository that is maintained by, or on behalf of, the SRM system 502.

Further, the SM accuracy component 540 may execute the statistical model using the borrower's relationship attributes associated with the independent historical lending-product request. In doing so, the SM accuracy component 540 may generate a borrower intermediate score via the statistical model; and further, by applying a distribution function (i.e., a Standard Normal CDF), calculate a corresponding charge-off probability score.

The SM accuracy component 540 may further generate an accuracy score for the statistical model by comparing the charge-off probability score with an actual record—from the independent set of historical lending-product data—of whether the borrower did in fact default on payment of the independent historical lending product.

In some examples, the SM accuracy component 540 may further compare the accuracy score with a predetermined accuracy threshold. In one example, the SM accuracy component 540 may determine that the accuracy score is greater than or equal to a predetermined accuracy threshold. In this example, the SM accuracy component 540 may transmit a message to the SM selection component 532 indicating that the statistical model may be used to analyze a lending-product request. Alternatively, the SM accuracy component 540 may determine that the accuracy core is less than the predetermined accuracy threshold. In this latter example, the SM accuracy component 540 may transmit a message to the SM selection component 532 to discontinue use of the statistical model. Further, the SM accuracy component 540 may transmit an additional message to the recommendation module 526 indicating a discontinued use of the statistical model.

The SM accuracy component 540 may monitor accuracy scores of each statistical model on a continuous basis, per a predetermined schedule, or in response to a triggering event. The predetermined schedule may correspond to any time interval, such as one day, one week, or one month. A triggering event may be initiated by an administrator of the SRM system 502, or an independent accounting of a predetermined number of charge-off predictions made by a statistical model.

The user-interface module 514 may enable an administrator to interact with the SRM system 502 via data input devices and data output devices. The data input devices may include, but are not limited to, combinations of one or more keypads, keyboards, mouse devices, touch screens that accept gestures, microphones, voice or speech recognition devices, and any other suitable devices or other electronic/software selection methods. The data output devices may include visual displays, speakers, virtual reality (VR) gear, haptic feedback devices, and/or so forth. In some examples, the administrator may use the user-interface module 514 to cause the SM analysis module 522 to adjust the approval cutoff threshold. The administrator may monitor portfolio metrics, such as charge offs, to achieve a desired balance between portfolio risk and return.

In other examples, the administrator may use the user-interface module 514 to configure a loan qualify score formula or a borrower score formula for use the HM analysis module 520 or the SM analysis module 522, respectively.

The reporting module 524 may be configured to transmit a message to a client device of a borrower indicating whether a lending-product has been approved or denied. In some examples, the reporting module 524 may receive a message from the HM analysis module 520 or the SM analysis component 538 of the SM analysis module 522 indicating whether a lending-product is denied or approved. Further, the reporting module 524 may be configured to transmit a message to a financial institution indicating that a lending-product request associated with a borrower has been approved or denied.

The recommendation module 526 may be configured to transmit one or more recommendation(s) to an administrator of the SRM system 502. For example, the recommendation module 526 may receive a message from the SM accuracy component 540 indicating a discontinued use of a statistical model, based at least in part on an accuracy score being less than a predetermined threshold. In this example, the recommendation module 526 may transmit a recommendation to an administrator of the SRM system 502 recommending an update to historical lending-product data associated with the statistical model.

Further, the recommendation module 526 may receive a message from the SM analysis component 538 indicating a recommended adjustment to the approval cutoff threshold. In doing so, the recommendation module 526 may transmit a recommendation to an administrator of the SRM system 502 that includes the recommended adjustment to the approval cutoff threshold.

Alternatively, or additionally, the SRM system may detect and recommend a selection bias for subsets of historical lending-product data based on a disparity of correlations between a plurality of existing, statistical models.

The data repositories 528 may include, but is not limited to, a relationship attribute repository, a statistical model repository, and a historical lending-product data repository. The data repositories 528 may be maintained by the SRM system 502. Alternatively, the data repositories 528 may be maintained by a financial institution or a third-part service provider on behalf of the financial institution or the SRM system 502. The relationship attribute repository may include client profile data associated with a plurality of borrowers. The client profile data may include relationship attributes, such as a length of relationship of the borrower with the financial institution, a payment history that includes the number of times the borrower paid open and closed loan payments on time, a direct deposit history that includes the number of direct deposits for which the borrower is a primary account holder, electronic transaction history that includes the number of electronic transactions for which the borrower is a primary account holder, an aggregated deposit balance during a predetermined transaction period.

The statistical model repository may include one or more statistical models used to analyses lending-product requests via the SRM system 502. In various examples, the statistical model repository may include statistical models that are currently in use, and statistical models that were historically in-use but currently discontinued.

The historical lending-product data repository may include sets of historical lending-product data that was used to generate one or more statistical models. In some examples, the historical lending-product data may also include subsets of historical lending-product data that are derived from a set of historical lending-product data. The historical lending-product data repository may include sets and subsets of historical lending-product data that is current in use, and historically in-use but currently discontinued.

FIGS. 6, 7, 8, and 9 present processes 600, 700, 800, and 900 that relate to operations of the SRM system. Each of processes 600, 700, 800, and 900 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 600, 700, 800, and 900 are described with reference to the computing environment 100 of FIG. 1.

Figure 6:
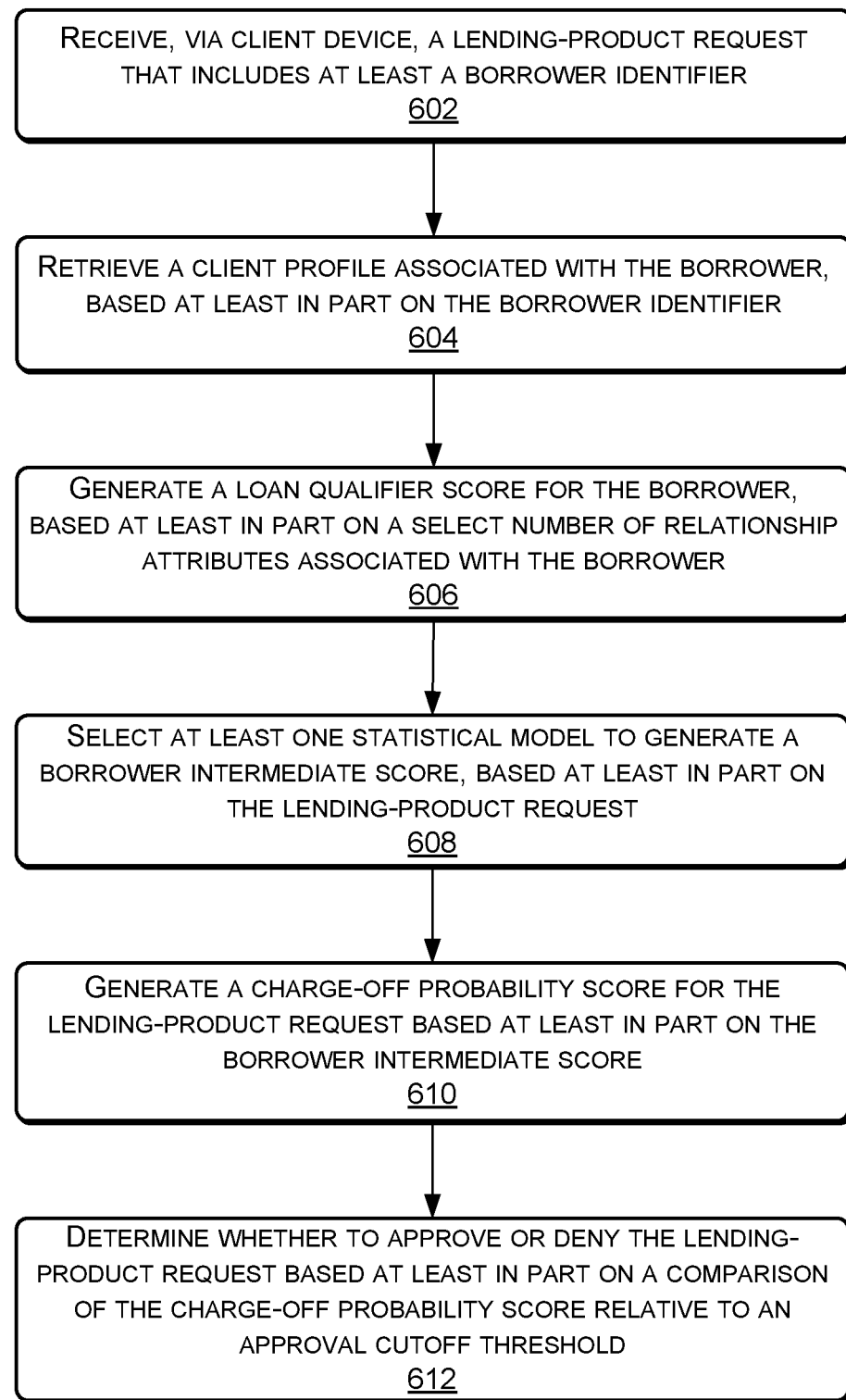
FIG. 6 illustrates a SRM system process to select one a heuristic model analysis or a statistical model analysis to determine whether to approve a lending-product request.

FIG. 6 illustrates a SRM system process to select one a heuristic model analysis or a statistical model analysis to determine whether to approve a lending-product request. The heuristic model analysis model may be configured to approve a lending-product request for a low-risk borrower, a low-risk lending-product, or a combination of both.

At 602, the SRM system may receive, via a client device, a lending-product request that includes at least a borrower identifier. In some examples, the lending-product request may further include a lending-product identifier that is associated with an intended purpose of the lending-product request (i.e., lending-product category). For example, the lending-product request may be associated with the purchase of an automobile, recreational vehicle, marine vehicle, or to finance payment of outstanding health, household, or any other type of consumer product or service.

At 604, the SRM system may retrieve client profile data associated with the borrower, based at least in part on the borrower identifier. The client profile data may include one or more relationship attributes that describe observable characteristics of the borrower's relationship with a financial institution. Alternatively, the SRM system may retrieve the one or more relationship attributes from a relationship attribute repository native to the SRM system, based at least in part on the borrower identifier.

At 606, the SRM system may generate a loan qualifier score for the borrower, based at least in part on a select number of relationship attributes associated with the borrower. For example, the SRM system may assign numerical scores to each of the select number of relationship attributes. In doing so, the loan qualifier score may correspond to a mathematical combination of each of the numerical scores. In some examples, the loan qualifier score may be further based on criteria such as a loan amount and intended purpose of the lending-product.

At 608, the SRM system may determine that the loan qualifier score for the borrower is less than the predetermined heuristic threshold. In this instance, the SRM system may select at least one statistical model to analyze the lending-product request. More specifically, the SRM system may generate at least one statistical model that further generates a plurality of relationship attribute coefficients. In doing so, the SRM system may calculate a borrower intermediate score for the lending-product request by applying the borrower's relationship attributes to the plurality of relationship attribute coefficients generated by the statistical model.

Alternatively, the SRM system may determine that the loan qualifier score is greater than or equal to a predetermined heuristic threshold. In this way, the SRM system may approve the lending-product request. In some examples, an administrator of the SRM system may configure a predetermined heuristic threshold to approve lending-product requests for low risk borrowers, low-risk products, or a combination of both.

At 610, the SRM system generate a charge-off probability score for the lending-product request based at least in part on the borrower intermediate score. The SRM system may calculate the charge-off probability score by applying a Normal CDF to the intermediate borrower score.

At 612, the SRM system may determine whether to approve or deny the lending-product request, based at least in part on a comparison of the charge-off probability score relative to an approval cutoff threshold. In one example, the SRM system may determine that the charge-off probability score for the lending-product request is greater than or equal to the approval cutoff threshold. In doing so, the SRM system may process an approval of the lending-product request and further transmit an indication to the client device of the borrower indicating that the lending-product request has been approved.

Alternatively, the SRM system may determine that the charge-off probability score for the lending-product request is less than the approval cutoff threshold. In this instance, the SRM system may process a denial of the lending-product request and further transmit an indication to the client device of the borrower indicating that the lending-product request has been denied. In some examples, the approval cutoff threshold may be used as a method of balancing a lending-product portfolio risk versus return.

Figure 7:
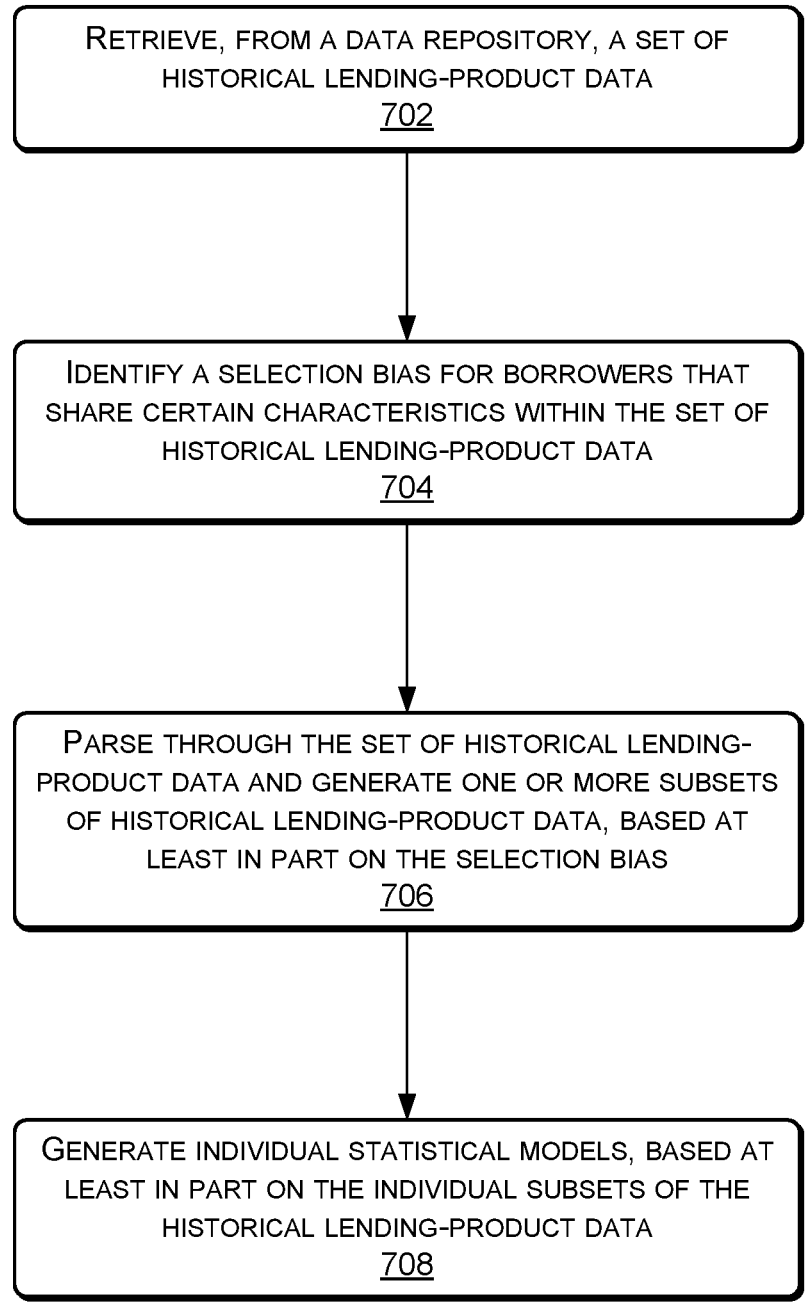
FIG. 7 illustrates a SRM system process to generate a statistical model based on a set of historical lending-product data.

FIG. 7 illustrates a SRM system process to generate a statistical model based on a set of historical lending-product data. In some examples, the SRM system may generate a subset of historical lending-product data from the set of historical lending-product data, based on a selection bias of shared characteristics within the set of historical lending-product data. In a non-limiting example, a lending-product request that is associated with a borrower that resides within a particular geographic region may be analyzed using a statistical model that is generated by a subset of historical lending-product data that is biased towards that same, particular geographic region.

At 702, the SRM system may retrieve, from a data repository, a set of historical lending-product data. In some examples, the data repository may be maintained by a financial institution, the SRM system, or a third-party service provider on behalf of one of the financial institution or the SRM system. Further, the set of historical lending-product data may include client profile data associated with the borrower, relationship attributes associated with a plurality of borrowers, historical records of corresponding lending-products, denials of lending-product requests, actual charge-offs associated with approved lending-products, or any combination thereof.

At 704, the SRM system may identify a selection bias for borrowers that share certain characteristics within the set of historical lending-product data. In some examples, the selection bias may be directed towards shared characteristics, such as a geographic location, portions of client profile data (i.e., employment status, income bracket, etc.), lending-product category (i.e., an intended purpose of a lending-product), loan amount, or any combination thereof.

At 706, the SRM system may parse through the set of historical lending-product data and generate one or more subsets of historical lending-product data based at least in part on the selection bias.

At 708, the SRM system may generate individual statistical models, based at least in part on the individual subsets of the historical lending-product data. In other words, the SRM system may generate individual statistical models that focus on shared borrower characteristics, such as a geographic location, portions of client profile data (i.e., employment status, income bracket, etc.), lending-product category, loan amount, or any combination thereof.

Figure 8:
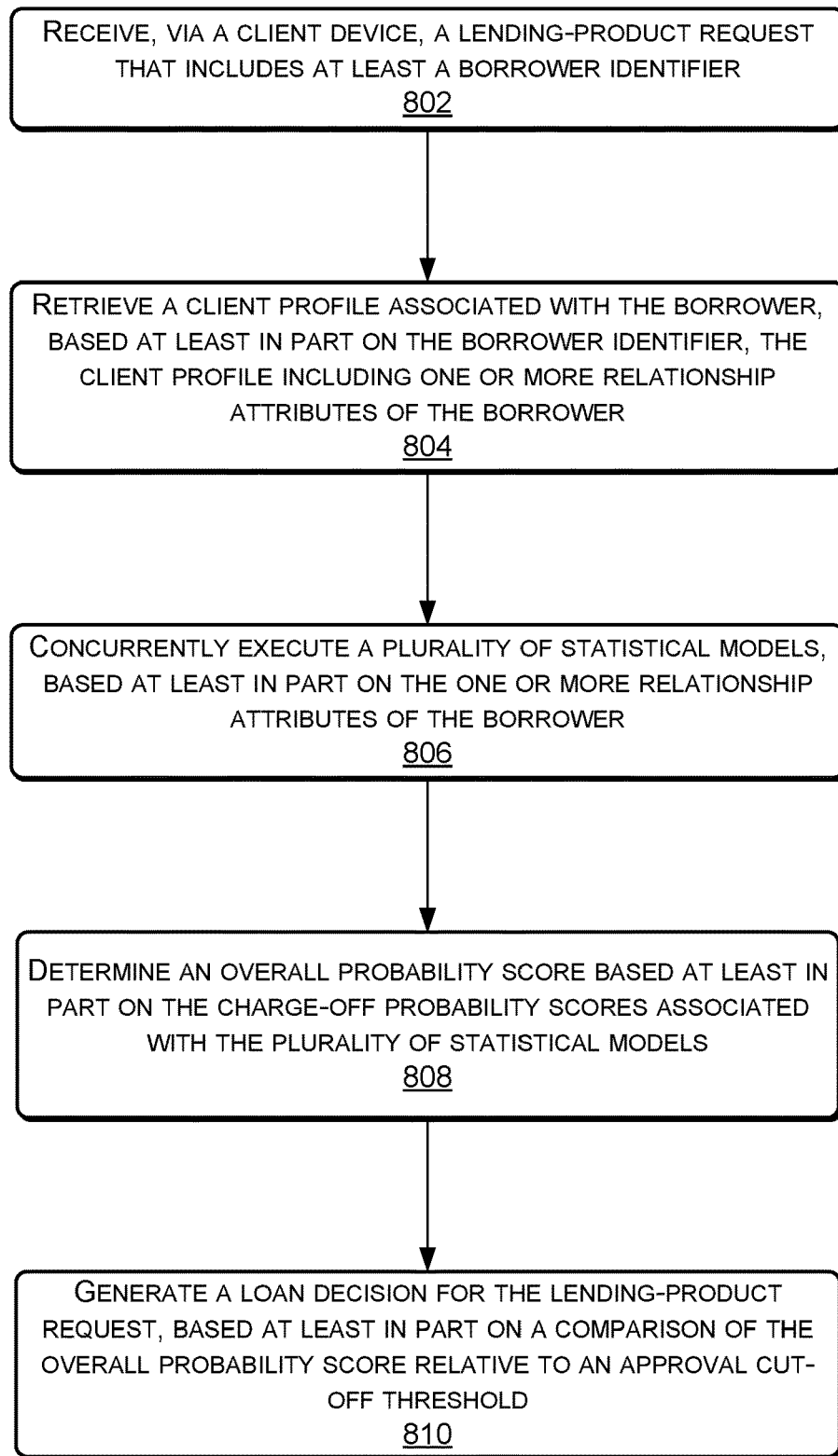
FIG. 8 illustrates a SRM system process to execute a plurality of statistical models to determine an overall charge-off probability score for approval of a lending-product request.

FIG. 8 illustrates a SRM system process to execute a plurality of statistical models to determine an overall charge-off probability score for approval of a lending-product request. In various examples, the SRM system may generate a plurality of statistical models that are based on a selection bias of subsets of historical lending-product data. Each subset of historical lending-product data may share one or more similar characteristics such as a geographic location, portions of client profile data (i.e., employment status, income bracket, etc.), lending-product category (i.e., intended purpose of a lending-product), loan amount, or any combination thereof.

At 802, the SRM system may receive, via a client device, a lending-product request that includes at least a borrower identifier. The lending-product request may further include a lending-product identifier, a loan amount, of a combination of both.

At 804, the SRM system may generate or retrieve a client profile associated with the borrower, based at least in part on the borrower identifier. The client profile may include one or more relationship attributes that describe observable characteristics of the borrower's relationship with a financial institution.

At 806, the SRM system may concurrently execute a plurality of statistical models using the one or more relationship attributes associated with the borrower. In doing so, the SRM system may generate borrower intermediate scores from the results of each of the individual statistical models; and further, by applying a distribution function (i.e., a Standard Normal CDF), calculate corresponding charge-off probability scores for each of the borrower intermediate scores.

At 808, the SRM system may determine an overall charge-off probability score for the lending-product request based at least in part on the charge-off probability scores associated with the plurality of statistical models. In one example, the overall charge-off probability score may be based on a mean-value or a median-value of the charge-off probability scores. Alternatively, the overall charge-off probability score may be based on the lowest-value of the charge-off probability scores.

At 810, the SRM system may generate a loan decision for the lending-product request, based at least in part on a comparison of the overall probability score relative to an approval cutoff threshold. In this example, the loan decision may correspond to an approval of the lending-product request based at least in part on the overall charge-off probability score being greater than or equal to the approval cutoff threshold. Alternatively, the loan decision may correspond to a denial of the lending-product request, based least in part on the overall probability score being less than the approval cutoff threshold.

Figure 9:
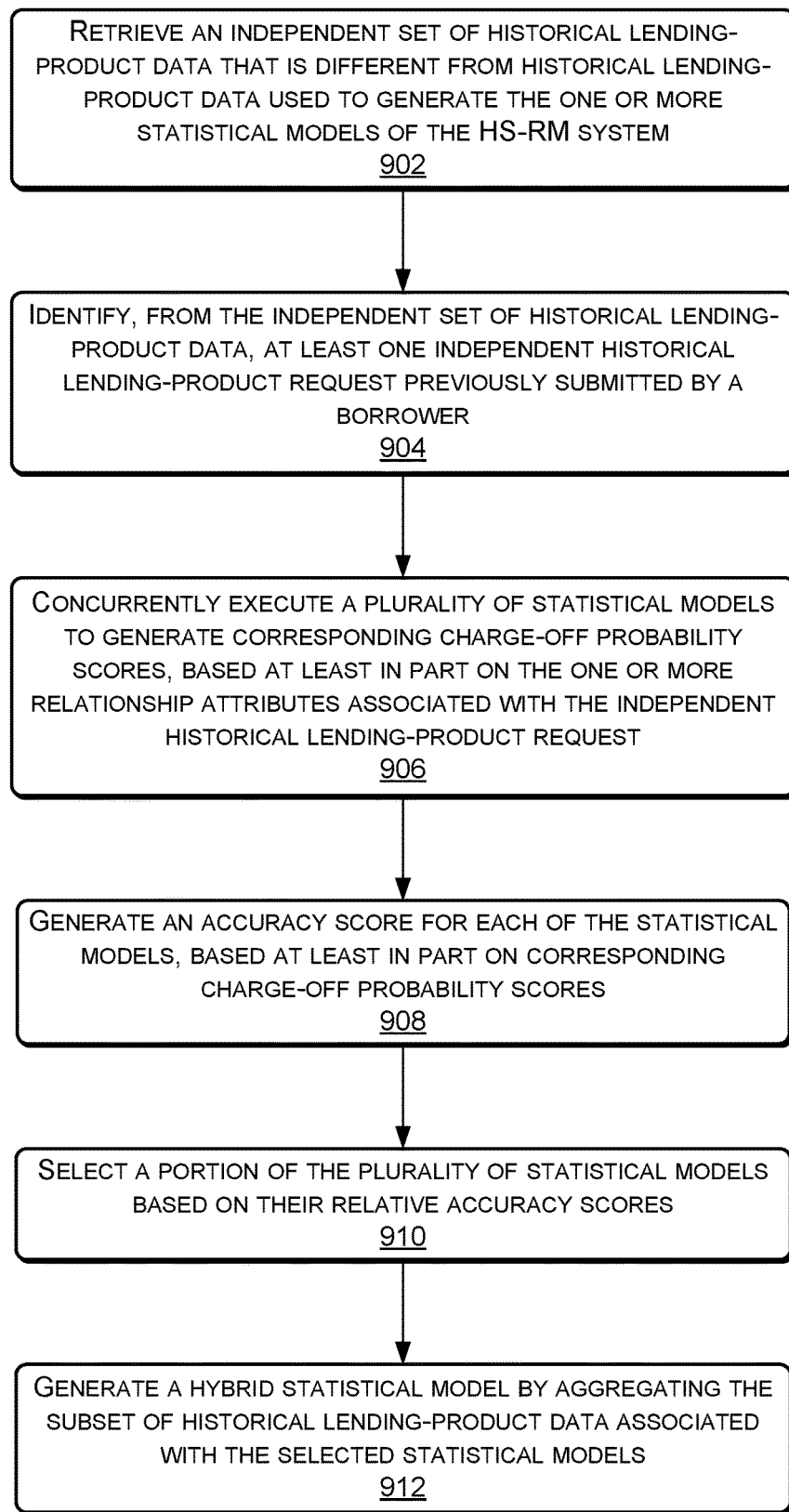
FIG. 9 illustrates a SRM system process to generate a hybrid statistical model based on an aggregated set of historical lending-product data.

FIG. 9 illustrates a SRM system process to generate a hybrid statistical model based on an aggregated set of historical lending-product data. In one example, the SRM system may selectively aggregate subsets of historical lending-product data that are associated with statistical models that maintain a threshold accuracy score. An accuracy score of statistical model is intended to quantify the degree to which a statistical model correctly predicts a borrower' default or on-time loan payment (i.e., charge-off probability score).

At 902, the SRM system may retrieve an independent set of historical lending-product data that is different from historical lending-product data used to generate the one or more statistical models of the SRM system. The SRM system may retrieve the independent set of historical lending-product data from a financial institution, or one or more third-party service providers that maintain such data on behalf of a financial institution or on behalf of a similar organization.

At 904, the SRM system may identify, from the independent set of historical lending-product data, at least one independent historical lending-product request previously submitted by a borrower. The SRM system may use the independent historical lending-product request to validate an accuracy of a statistical model, before aggregating subsets of historical lending-product data to generate a hybrid statistical model. The SRM system may identify different historical lending-products requests for each statistical model. In one non-limiting example, a SRM system may determine that a particular statistical model is based on a subset of historical lending-product data that biased towards a particular characteristic, such as a particular geographic location. In this instance, the SRM system may select an independent historical lending-product request from the independent set of historical lending-product data that corresponds to the selection bias of the particular geographic location.

Further, the SRM system may further retrieve a borrower's relationship attributes that are associated with the independent historical lending-product request. In one example, the borrower's relationship attributes may be retrieved from the independent set of historical lending-product data (i.e., client profile data), or a repository that is maintained by, or on behalf of, the SRM system.

At 906, the SRM system may concurrently execute a plurality of statistical models using the borrower's relationship attributes associated with the independent historical lending-product request from the independent set of historical lending-product data. In doing so, the SRM system may generate borrower intermediate scores from the results of each of the individual statistical models; and, further, by applying a distribution function (i.e., a Standard Normal CDF), calculate corresponding charge-off probability scores for each of the borrower intermediate scores.

At 908, the SRM system may generate an accuracy score for each of the statistical models, based at least in part on corresponding charge-off probability scores. For example, the SRM system may compare Feach charge-off probability score with an actual record—from the independent set of historical lending-product data—of whether the borrower did in fact default on payment of the historical lending-product.

At 910, the SRM system may the select a portion of the plurality of statistical models based on their relative accuracy scores. In one example, the SRM system may select a predetermined number of statistical models with the highest relative accuracy scores among the plurality of statistical models. Alternatively, the SRM system may select statistical models with an accuracy score above a predetermined hybrid accuracy threshold. The predetermined hybrid accuracy threshold may be set by an administrator of the SRM system.

At 912, the SRM system may generate a hybrid statistical model by aggregating the subset of historical lending-product data associated with the statistical models that were selected based on their relative accuracy scores.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A statistical risk management system (SRM) for generating a heuristic analysis of loan charge-off risk in small, short-term loans for borrowers who have immediate cash needs, the SRM comprising:

one or more processors,
a user interface module in communication with the one or more processors, and
memory coupled to the one or more processors, the memory including one or more modules that are executable by the one or more processors to:
download, from the user interface module, to a client device of a borrower, for installation on the client device, an application for generating a lending-product request;
receive, at the user interface module and from the borrower via the client device, a lending-product request that includes at least a loan amount and a borrower identifier;
retrieve, via the user interface module and from a data-store, client profile data associated with the borrower, based at least in part on the borrower identifier, the client profile data including one or more relationship attributes that define historical interactions between the borrower and at least one financial institution;
generate, via the user interface module, a loan qualifier score based on the loan amount and the one or more relationship attributes associated with the borrower;
generate, via a Statistic Model (SM) generation component, at least one statistical model to analyze the lending-product request, wherein the at least one statistical model comprises a borrower intermediate score based on a plurality of relationship attribute coefficients;
retrieve, via the user interface module in electronic communication with an independent data repository maintained by at least one of a financial institution or a third-party service provider, historical lending-product data associated with a plurality of borrowers;
identify, via the SM generation component interacting with the user interface module, shared characteristics between the client profile data and the historical lending-product data;
generate, via the SM generation component, a plurality of statistical models, individual statistical models of the plurality of statistical models being based at least in part on individual ones of the shared characteristics between the client profile data and the historical lending-product data;
determine, via an SM accuracy component interacting with the SM generation component, an accuracy score for each of the individual statistical models of the plurality of statistical models, based at least in part on independent historical lending-product data which is different from the historical lending-product data, the accuracy score reflecting a likelihood that the borrower defaults or makes an on-time loan payment on the loan associated with the lending-product request;
select, as selected individual statistical models, via an SM selection component interacting with the SM accuracy component, a portion of the plurality of the statistical models that have accuracy scores above a predetermined accuracy score threshold;
perform, simultaneously via an SM analysis component interacting with the SM selection component, analyses of the lending-product request using the selected individual statistical models of the plurality of statistical models and without using non-selected individual statistical models of the plurality of statistical models;
generate via the SM analysis component an overall charge-off probability score for the lending-product request, based at least in part on the analyses of the lending-product request using the borrower intermediate score and the selected individual statistical models and without using the non-selected individual statistical models;
determine, via the SM analysis component, whether the lending-product request is approved, based at least in part on the overall charge-off probability score being greater than or equal to a predetermined cutoff threshold, wherein the approval or denial does not rely on time-consuming and lengthy credit worthiness checks;
transmit, via a reporting module interacting with the SM analysis component, an indication of approval or denial of the lending-product request to at least one of the client device or a computing device associated with the financial institution; and
monitor, via the user interface module, the rate of defaults of a plurality of loans and adjusting the loan approval cutoff threshold to balance portfolio risk versus return.

2. The system of claim 1, wherein the one or more modules are further executable by the one or more processors to:
retrieve, from one or more third-party services, a set of historical lending-product data that includes previously executed lending-products by a plurality of borrowers;
generate one or more subsets of data from the set of historical lending-product data, based at least in part on one or more criteria; and
derive individuals ones of the plurality of relationship attribute coefficients for the selected individual statistical models and for the non-selected individual statistical models, based at least in part on individual ones of the one or more subsets of data.

3. The system of claim 2, wherein the one or more criteria indicates a selection bias of historical lending-product data, the selection bias of historical lending-product data including one or more of a geographic location, a preceding time-period relative to a current date, a lending-product category, or a component of client profile data.

4. The system of claim 2, wherein determining, for each of the statistical models, the accuracy score comprises:
retrieving, from a data-store, an additional set of historical lending-product data that is associated with previously executed lending-products by a plurality of borrowers, the additional set of historical lending-product data being different from the set of historical lending-product data used to generate a particular statistical model of the portion of the plurality of statistical models;
performing an analysis of the additional set of historical lending-product data using the particular statistical model, the analysis to validate an accuracy of a corresponding set of relationship attribute coefficients of the particular statistical model;
generating a charge-off probability score for the particular statistical model, based at least in part on the analysis;
calculating a delta score that corresponds to a difference between the charge-off probability score and actual historical charge-off data within the additional set of historical lending-product data; and
generating the accuracy score for the particular statistical model based at least in part on the delta score,
wherein the one or more modules are further executable by the one or more processors to adjust the overall charge-off probability score for the lending-product request, based at least in part on the accuracy score for the particular statistical model.

5. The system of claim 4, wherein the one or more modules are further executable by the one or more processors to:
   determine that the accuracy score of the particular statistical model is less than a first predetermined accuracy threshold; and
   adjust the overall charge-off probability score associated with the lending-product request by excluding the analysis associated with the particular statistical model.

6. The system of claim 4, wherein the one or more modules are further executable by the one or more processors to:
   determine that the accuracy score for the particular statistical model is less than a second predetermined accuracy threshold;
   derive an updated set of relationship attribute coefficients associated with the particular statistical model, based at least in part on the additional set of historical lending-product data;
   determine an updated charge-off probability score for the particular statistical model, based at least in part on the updated set of relationship attribute coefficients; and
   adjust the overall charge-off probability score associated with the lending-product request based at least in part on the updated charge-off probability score.

7. The system of claim 1, wherein the one or more modules are further executable by the one or more processors to:
   generate individual charge-off probability scores from analyses of the individual statistical models of the selected statistical models and without analyses of the non-selected individual statistical models, and
   wherein the overall charge-off probability score corresponds to a mean-value of the individual charge-off probability scores.

8. The system of claim 1, wherein the one or more modules are further executable by the one or more processors to:
   generate individual charge-off probability scores from analyses of the selected individual statistical models and without analyses of the non-selected individual statistical models, and
   wherein the overall charge-off probability score corresponds to a lowest value of the individual charge-off probability scores.

9. The system of claim 1, wherein the one or more modules are further executable by the one or more processors to:
   receive a profit target that is associated with the lending-product request; and
   determine the predetermined cutoff threshold for approval of the lending-product request, based at least in part on the profit target.

10. One or more non-transitory computer-readable media for generating a heuristic analysis of loan charge-off risk in small, short-term loans for borrowers who have immediate cash needs, storing computer-executable instructions that, when executed on one or more processors, cause the one or more processors to perform acts comprising:
   receiving, from a borrower via a client device in communication with the one or more processors, a lending-product request that includes at least a loan amount and a borrower identifier;
   retrieving, from a data-store via a user interface module in electronic communication with an independent data repository maintained by at least one of a financial institution or a third-party service provider, a set of historical lending-product data that includes previously executed lending-products by a plurality of borrowers;
   retrieving, from the data-store, client profile data associated with the borrower, based at least in part on borrower identifier, the client profile data including one or more relationship attributes that define historical interactions between the borrower and at least one financial institution;
   generating, via the user interface module, a loan qualifier score based on the loan amount and the one or more relationship attributes associated with the borrower;
   generating, via a Statistical Model (SM) generation component, one or more subsets of data from the set of historical lending-product data, based at least in part on one or more criteria that indicate a selection bias of a lending-product based on a set of characteristics associated with the borrower, the selection bias impacting at least the loan amount, the set of characteristics including at least a geographic location associated with the borrower or a component of client profile data associated with the borrower;
   identifying, via the SM generation component interacting with the user interface module, shared characteristics between the client profile data and the subsets of data from the historical lending-product data;
   generating, via the SM generation component, individual statistical models to analyze the lending-product request, individual statistical models comprise being based at least in part on the selection bias and individual ones of the shared characteristics between the client profile data and the subsets of data from the historical lending-product data;
   determining, via an SM accuracy component interacting with the SM generation component, for each of the individual statistical models, an accuracy score that reflects an accuracy of the individual statistical models, based at least in part on independent historical lending-product data which is different from the historical lending-product data, the accuracy score reflecting a likelihood that the borrower defaults or makes an on-time loan payment on the loan associated with the lending-product request;
   selecting, as selected individual statistical models, via an SM selection component interacting with the SM accuracy component, a portion of the individual statistical models that have accuracy scores above a predetermined accuracy score threshold;
   performing, simultaneously via an SM analysis component interacting with the SM selection component, analyses of the lending-product request using the selected individual statistical models of the plurality of statistical models and without using non-selected individual statistical models of the plurality of statistical models;
   generating, via the SM analysis component, an overall charge-off probability score for the lending-product request, based at least in part on the analyses of the lending-product request using the borrower intermediate score and the selected individual statistical models and without using the non-selected individual statistical models;
   determining, via the SM analysis component, that the lending-product request is approved, based at least in part on the overall charge-off probability score being greater than a predetermined cutoff threshold, wherein the approval or denial does not rely on time-consuming and lengthy credit worthiness checks;

transmitting, via a reporting module interacting with the SM analysis component, an indication that the lending-product request is approved to at least one of the client device or a computing device associated with the financial institution; and monitoring, via the user interface module, the rate of defaults of a plurality of loans and adjusting the loan approval cutoff threshold to balance portfolio risk versus return.

11. The one or more non-transitory computer-readable media of claim 10,
wherein, performing, simultaneously, analyses of the lending-product request using the selected individual statistical models and without using the non-selected individual statistical models is further based at least in part on the client profile data.

12. The one or more non-transitory computer-readable media of claim 10, further storing instructions that, when executed cause the one or more processors to perform acts comprising:
generate a hybrid statistical model based at least in part on individual sets of relationship attributes coefficients associated with the portion of the individual statistical models and without the remaining portion of the individual statistical models,
wherein to generate the overall charge-off probability score is further based at least in part on an analysis of the lending-product request via the hybrid statistical model.

13. The one or more non-transitory computer-readable media of claim 10, further storing instructions that, when executed cause the one or more processors to perform acts comprising:
generating individual charge-off probability scores from analyses of the portion of the individual statistical models and without analyses of the remaining portion of the individual statistical models,
wherein the overall charge-off probability score corresponds to one of a mean-value of the individual charge-off probability scores, or a lowest-value of the individual charge-off probability scores.

14. The one or more non-transitory computer-readable media of claim 10, further storing instructions that, when executed cause the one or more processors to perform acts comprising:
retrieving, from a data-store, an additional set of historical lending-product data that is associated with previously executed lending-products by a plurality of borrowers, the additional set of historical lending-product data being different from the set of historical lending-product data;
determining an accuracy score of a particular statistical model, based at least in part on the additional set of historical lending-product data; and
adjusting the overall charge-off probability score for lending-product request based at least in part on the accuracy score for the particular statistical model.

15. The one or more non-transitory computer-readable media of claim 10, further storing instructions that, when executed cause the one or more processors to perform acts comprising:
determining correlations between the individual statistical models; and
recommending an additional selection bias for the one or more subset of data from the sets of historical lending-product data, based at least in part on a disparity of correlation between the individual statistical models.

16. The one or more non-transitory computer-readable media of claim 10, wherein the selection bias further impacts a lending-product category, and
wherein the set of characteristics associated with the borrower further includes a portion of client profile data associated with the borrower.

17. A computer-implemented method for generating a heuristic analysis of loan charge-off risk in small, short-term loans for borrowers who have immediate cash needs, comprising:
under control of one or more processors:
receiving, from a borrower via a client device in communication with the one or more processors, a lending-product request that includes at least a lending-product category identifier and a loan amount;
retrieving, from a data-store, client profile data associated with the borrower, the client profile data including one or more relationship attributes that define historical interactions between the borrower and at least one financial institution;
generating, via the user interface module, a loan qualifier score based on the loan amount and the one or more relationship attributes associated with the borrower;
retrieving, via a user interface module in electronic communication with one or more third-party services, a set of historical lending-product data that includes at least the lending-product category, based at least in part on the lending-product category identifier;
deriving individual sets of relationship attribute coefficients, based at least in part on the set of historical lending-product data;
identifying, via the SM generation component interacting with the user interface module, shared characteristics between the client profile data and the set of historical lending-product data;
generating, via a Statistical Model (SM) generation component, individual statistical models to analyze the lending-product request, based at least in part on a derivation of individual sets of relationship attribute coefficients, wherein at least one of the individual statistical models comprises a borrower intermediate score;
determining, via an SM accuracy component interacting with the SM generation component, for each of the individual statistical models, an accuracy score that reflects an accuracy of the individual statistical model, based at least in part on independent historical lending-product data which is different from the set of historical lending-product data, the accuracy score reflecting a likelihood that the borrower defaults or makes an on-time loan payment on the loan associated with the lending-product request;
selecting, as selected individual statistical models, via an SM selection component interacting with the SM accuracy component, a portion of the individual statistical models that have accuracy scores above a predetermined accuracy score threshold;
generating a hybrid statistical model by aggregating subsets of historical lending-product data that are associated with the selected individual statistical models and without using non-selected individual statistical models of the individual statistical models;
determining, via the SM analysis component, that the lending-product request is approved, based at least in part on the analyses of the lending-product request using the hybrid statistical model, wherein the approval or denial does not rely on time-consuming and lengthy credit worthiness checks;

transmitting, via a reporting module interacting with the SM analysis component, an indication that the lending-product request is approved to at least one of the client device or a computing device associated with the financial institution; and monitoring, via the user interface module, the rate of defaults of a plurality of loans and adjusting the loan approval cutoff threshold to balance portfolio risk versus return.

18. The computer-implemented method of claim 17, further comprising:
generating individual charge-off probability scores for the lending-product request from analyses of the portion of the individual statistical models and without analyses of the remaining portion of the individual statistical models; and
determining an overall charge-off probability score for the lending-product request based at least in part on one of a mean-value of the individual charge-off probability scores or a lowest-value of the individual charge-off probability scores,
wherein, determining that the lending-product request is approved is further based at least in part on the overall charge-off probability score being greater than a predetermined cutoff threshold.

19. The computer-implemented method of claim 17, further comprising:
generating a hybrid statistical model based at least in part on the individual sets of relationship attribute coefficients; and
performing an analysis of the hybrid statistical model based at least in part on the client profile data; and
determining an overall charge-off probability score for the lending-product request from the analysis of the hybrid statistical model,
wherein determining that the lending-product request is approved is further based at least in part on an overall charge-off probability score.

20. The computer-implemented method of claim 17, further comprising:
identifying a selection bias of historical lending-product data that is associated with individual statistical models, the selection bias of historical lending-product data corresponding to at least one of a geographic region, preceding time-period relative to a current date, a type of lending-product, or a component of client profile data, and
generating subsets of historical lending-product data, based at least in part on the selection bias of historical lending-product data,
wherein, the individual sets of relationship attribute coefficients are further based at least in part on the subsets of historical lending-product data.

* * * * *